(12) United States Patent
Hardy

(10) Patent No.: US 11,442,075 B2
(45) Date of Patent: Sep. 13, 2022

(54) BALLISTIC PROJECTILE VELOCITY MEASUREMENT APPARATUS

(71) Applicant: Charles Hardy, Orefield, PA (US)

(72) Inventor: Charles Hardy, Orefield, PA (US)

(*) Notice: Subject to any disclaimer, the term of this patent is extended or adjusted under 35 U.S.C. 154(b) by 144 days.

(21) Appl. No.: 16/750,161

(22) Filed: Jan. 23, 2020

(65) Prior Publication Data

US 2021/0080481 A1   Mar. 18, 2021

Related U.S. Application Data

(60) Provisional application No. 62/795,890, filed on Jan. 23, 2019.

(51) Int. Cl.
| | | |
|---|---|---|
| *G01P 3/36* | (2006.01) | |
| *G01P 3/68* | (2006.01) | |
| *G01S 17/00* | (2020.01) | |

(52) U.S. Cl.
CPC ............ *G01P 3/685* (2013.01); *G01S 17/003* (2013.01)

(58) Field of Classification Search
None
See application file for complete search history.

(56) References Cited

U.S. PATENT DOCUMENTS 6,414,746 B1 *   7/2002   Stettner ................. G01S 17/894
356/4.01

FOREIGN PATENT DOCUMENTS

WO   WO 8807685   * 10/1988   ............. G01P 3/685
WO   WO 2006109298 A2 * 10/2006   ............. G01P 3/685

\* cited by examiner

*Primary Examiner* — Mark Hellner
(74) *Attorney, Agent, or Firm* — Design IP

(57) ABSTRACT

The present disclosure relates to a ballistic projectile velocity measurement apparatus that senses and records the times in which a projectile travels through two vertical planes represented by two sensor gates which are spaced horizontally from each other. The sensor gates each utilize an LED laser that emits a laser light through a diffuser along a diffusion angle into a plurality of laser light sensors to create a wall of laser light, and the sensor gates register a break in the wall of light when a ballistic projectile obstructs the light received by at least one laser light sensor. The ballistics apparatus then determines the velocity of the projectile based on the distance between the two gates and difference in time between the two plane-breaking events.

19 Claims, 18 Drawing Sheets

BALLISTIC PROJECTILE VELOCITY MEASUREMENT APPARATUS

BACKGROUND

In measuring ballistic projectile velocity, it has been common practice to use a pair of broad-band photodetectors spaced apart at a fixed known distance to produce, in turn, a signal to a common timing circuit at the point in time that a projectile interrupts the light detected by the photodetector indicating the projectile has just passed over each detector. The interval between each of the signals from the photodetectors indicating that a projectile has been detected and the known distance between the pair of photodetectors are used to compute the velocity of the ballistic projectile as it traversed the course, i.e. the distance, between the photodetector assemblies.

The assemblies housing the photodetectors, which are typically photo diodes or phototransistors, normally operate by having these receiving elements placed so that they can receive steady broad-band illumination from a constant light source such as the sun, specialty high intensity incandescent bulbs, or other broad-band light source. The photodetector assemblies are typically called "screens" in the ballistic projectile velocity measurement field for the reason that such assemblies have replaced earlier physical conducting grids or screens which recorded the passage of a projectile. Earlier screens were designed to utilize either incandescent light sources or ambient light from environmental sources, i.e. the sun. Screens utilizing ambient light from the sky required an optical slit, or other masking device, to restrict extraneous sources of light from being detected by the photodetectors.

With early photodetector assemblies, one typical problem encountered was that the illumination received by the photodetection receivers was not constant because of varying photoemission levels from the incandescent lamp or lamps, a varying amount of dust or other particles in the light transmission path between the source and the receiver, aging of the incandescent lamp filament, varying distances from the light source and the receiver, and varying atmosphere conditions and angles of the light source, i.e. the sun, in the case of sky screens. Particularly with regard to sky screens, the photosensitive receivers view only a segment of unobstructed sky through an optical slit which created a problem with the illumination level from the light source. On clear days, the illumination level was less than on hazy or partially obscured (cloudy) days and, for that reason, in order for a sky screen to properly operate under available light conditions, the light needed to be diffused, rather than be received directly from the source. Thus, while the optical slit created a partial focusing of the light, the diffuser element dispersed the direct light over a broader expanse, which also reduced potential problems from reflected light. Neither light source, incandescent or ambient, produced a constant, fixed level illumination source of light from which the photodetection receivers could detect the passage of a projectile because of the number of variables existing in the illumination source and from environmental conditions.

One environmental problem referenced above, i.e. reflected light, can cause a number of different types of misreadings by the photodetection receiver. When using ambient light from the sun, directed through an optical view slit (but without a diffuser), it was possible that the photodetector would respond because the circuit associated with that receiver was designed to detect any perturbation in the light level about the ambient level, regardless of the direction of that perturbation, lighter or darker. This is to say that reflected light from the projectile can be less than, approximately equal to, or greater than the amount of diffused light blocked by that projectile. If the reflected light is significantly greater than or significantly less than the amount of diffused light blocked by the projectile, the photodetection receiver would react as described above. In the case in which the reflected light is approximately equal to the amount of the diffused light which reaches the photosensitive element in the absence of a projectile, the receiver sees no significant change in the light level even though the projectile is passing between the light source and the receiver. Thus, a shadow, which would be expected to fall across the photosensitive element or elements, is essentially obliterated by the reflected light. Due to the cancellation of the shadow, which occurs earlier than the calculation within the apparatus where a change in light level is converted to an electrical signal and a time tag is placed on the signal, there is no way to recover the lost information by using any substituted electrical signal processing technique.

SUMMARY

In view of the foregoing background, a measurement and calculation apparatus for measuring a velocity of a ballistic projectile along a predetermined trajectory is provided. The apparatus comprises a base having a front end, a rear end, and a base length extending from the front end to the rear end; a front gate extending from the front end of the base and a rear gate extending from the rear end of the base, each of the front and rear gates including a gate stand having a left leg with a proximal and distal end, a right leg with a proximal end and a distal end, and a joint where the proximal ends of the left and right legs abut; an arcuate arm having a body with an arcuate shape that extends a distance between the distal ends of the left and right legs; a laser housed within the joint of the gate stand, the laser light being configured to emit a laser light toward the arcuate arm and between the left and right legs of the gate stand; a diffuser positioned between the laser and the arcuate arm, the diffuser being configured to diffuse the laser light emitting from the laser over a diffusion angle to create a wall of light; and a sensor array comprising a plurality of laser light sensors housed within the arcuate arm and configured to receive beams of diffused laser light emitted from the laser through the diffuser, the sensor array being configured to register perturbances in the wall of light caused by a ballistic projectile; and a chronograph processor configured to (a) receive a signal from the front gate when a perturbance in the wall of light of the front gate is registered and a signal from the rear gate when a perturbance in the wall of light of the rear gate is registered; (b) calculate a velocity of the ballistic projectile based the signals received from the front and rear gates and the base length.

In another embodiment, an apparatus is provided that comprises a front gate and a rear gate, each gate comprising a frame that defines a gate perimeter, the frame having a first end and a second end that is distal to the first end; a gate plane that passes through the first and second ends of the frame; a laser housed at the proximal end, the laser being adapted to emit light within a first wavelength band; at least one diffuser positioned between the laser and the second end, the at least one diffuser being adapted to diffuse light emitted from the laser into a wall of light that extends along the gate plane and throughout the gate perimeter; and a plurality of sensors located at the second end and adapted to sense light in the first wavelength band, the plurality of sensors being arranged in a sensor array housed within the arm and configured to receive beams of diffused laser light emitted from the laser through the at least one diffuser, the sensor array being configured to register perturbances in the wall of light caused by a ballistic projectile. The apparatus also includes a base that connects the front gate to the rear gate and provides a fixed gate distance between the front gate and the rear gate; a controller that is electrically connected to the plurality of sensors of each of the front gate and the rear gate, the controller being operationally configured to detect perturbances of the wall of light by a ballistic projectile based on electrical signals received from the plurality of sensors and to calculate a ballistic velocity based on an elapsed time between detection of a first perturbance in the wall of light in the front gate, detection of a second perturbance in the wall of light in the rear gate, a measured period of time between detection of the first perturbance and the second perturbance, and the gate distance. The at least one diffuser and the sensor array are operationally configured so that any perturbance of the wall of light by a ballistic projectile at any location within the gate perimeter results in a change in electrical signal in at least one of the plurality of sensors that is detectable by the controller.

BRIEF DESCRIPTION OF THE DRAWINGS

For a more complete understanding of the present invention, reference is made to the following detailed description of an embodiment considered in conjunction with the accompanying drawings, in which.

DETAILED DESCRIPTION OF THE INVENTION

Figure 1:
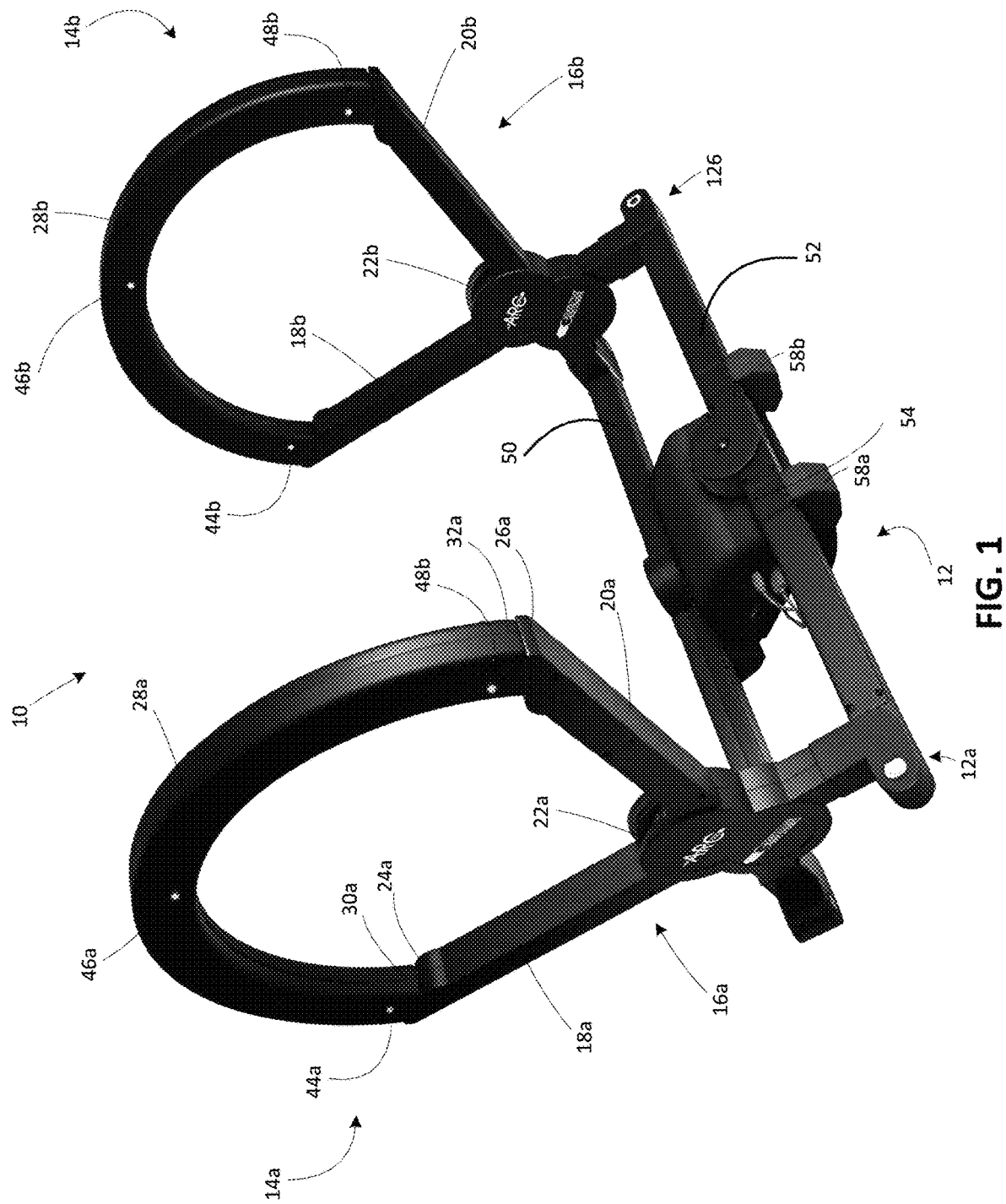
FIG. 1 is a perspective view of a ballistic projectile velocity measurement apparatus ("ballistics apparatus") constructed in accordance with an embodiment of the present invention.

The following disclosure is presented to provide an illustration of the general principles of the present invention and is not meant to limit, in any way, the inventive concepts contained herein. Moreover, the particular features described in this section can be used in combination with the other described features in each of the multitude of possible permutations and combinations contained herein.

All terms defined herein should be afforded their broadest possible interpretation, including any implied meanings as dictated by a reading of the specification as well as any words that a person having skill in the art and/or a dictionary, treatise, or similar authority would assign particular meaning. Further, it should be noted that, as recited in the specification and in the claims appended hereto, the singular forms "a," "an," and "the" include the plural referents unless otherwise stated. Additionally, the terms "comprises" and "comprising" when used herein specify that certain features are present in that embodiment but should not be interpreted to preclude the presence or addition of additional features, components, operations, and/or groups thereof.

The following disclosure is intended to be read in connection with the accompanying drawings, which are to be considered part of the entire written description of the invention. The drawing figures are not necessarily to scale, and certain features of the invention may be shown exaggerated in scale or in somewhat schematic form in the interest of clarity and conciseness. In this description, relative terms such as "horizontal," "vertical," "up," "down," "top," "bottom," as well as derivatives thereof (e.g., "horizontally," "downwardly," "upwardly," etc.) should be construed to refer to the orientation as then described or as shown in the drawing figure under discussion. These relative terms are for convenience of description and normally are not intended to require a particular orientation. Terms including "inwardly" versus "outwardly," "longitudinal" versus "lateral" and the like are to be interpreted relative to one another or relative to an axis of elongation, or an axis or center of rotation, as appropriate. Terms concerning attachments, coupling and the like, such as "connected" and "interconnected," refer to a relationship wherein structures are secured or attached to one another either directly or indirectly through intervening structures, as well as both moveable or rigid attachments or relationships, unless expressly described otherwise, and includes terms such as "directly" coupled, secured, etc. The term "operatively coupled" is such an attachment, coupling, or connection that allows the pertinent structures to operate as intended by virtue of that relationship.

The present disclosure relates to a ballistic projectile velocity measurement apparatus that senses and records the times in which a projectile travels through two vertical planes represented by two sensor gates which are spaced horizontally from each other. The ballistics apparatus then determines the velocity of the projectile based on the distance between the two gates and difference in time between the two plane-breaking events.

Structural Parts

Figure 2:
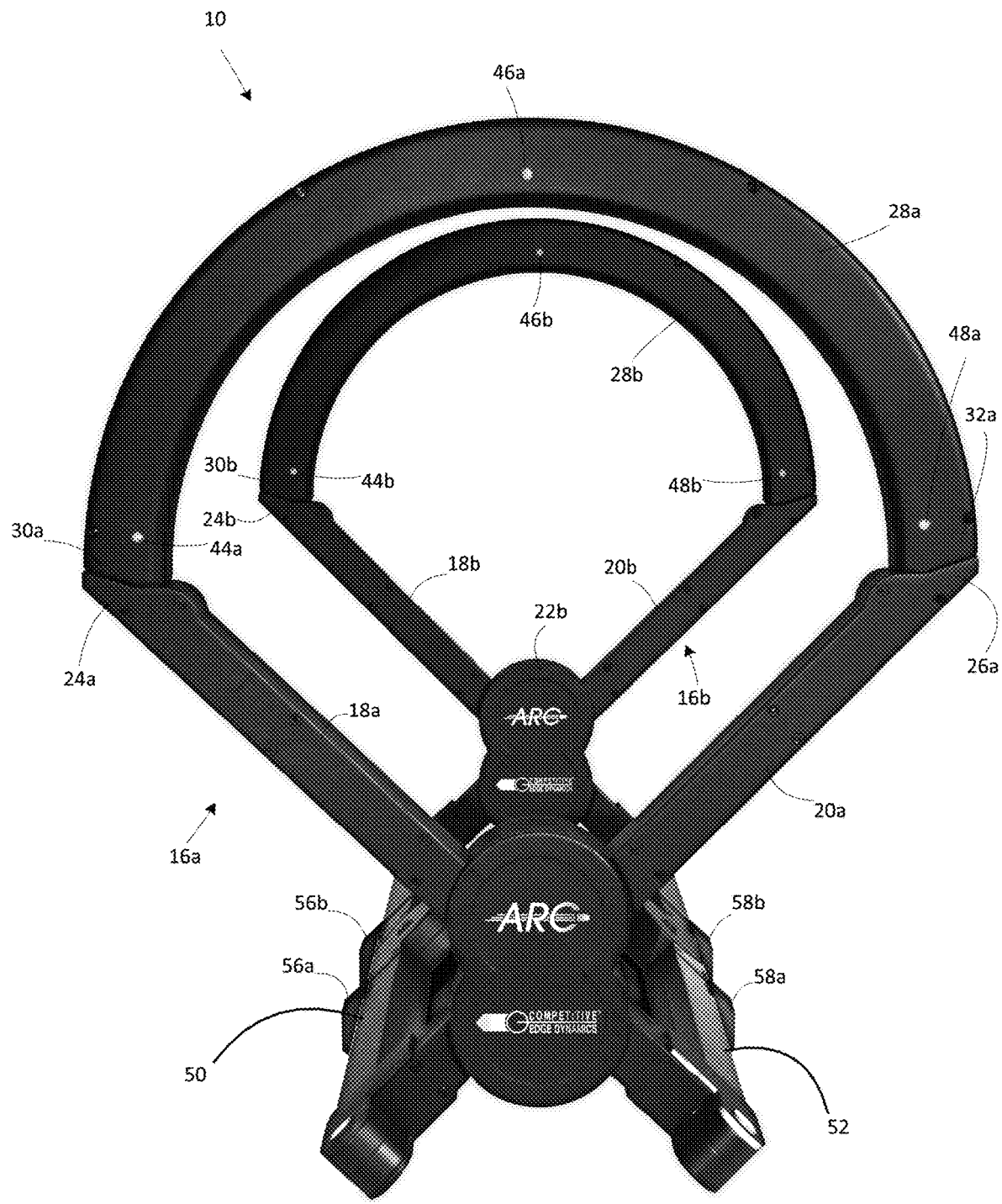
FIG. 2 is a front elevational view of the ballistics apparatus shown in FIG. 1.

Referring to FIGS. 1 and 2, the ballistics apparatus 10 comprises an elongate base 12 having a front end 12a and a rear end 12b, with the front end 12a having a front gate 14a extending upwardly therefrom and the rear end 12b having a rear gate 14b extending upwardly therefrom. Because the front gate 14a and the rear gate 14b are substantially identical in structure, this disclosure will describe the features of the front gate 14a only for the purpose of simplification. All features of the front gate 14a discussed herein will have reference characters beginning with a numeral and ending with "a," and corresponding features of the rear gate 14b will have reference characters beginning with the same numeral and ending with "b."

The front gate 14a is formed by a front V-shaped stand 16a having a left front leg 18a, a right front leg 20a, and a front disc-shaped joint 22a that adjoins the left and right front legs 18a, 20a at their proximal ends. The left and right front legs 18a, 20a of the front V-shaped stand 16a have left and right distal ends 24a, 26a upon which a front arcuate arm 28a sits. The front arcuate arm 28a has left and right arm ends 30a, 32a that contact the front left and right distal ends 24a, 26a of the front V-shaped stand 16a. Each of the left and right arm ends 30a, 32a of the front arcuate arm 28a and the left and right distal ends 24a, 26a of the front V-shaped stand 16a include magnetic contacts that allow for electrical signals to be communicated from the front arcuate arm 28a through the front V-shaped stand 16a and eventually to the base 12. Such electrical signals will be discussed in detail further below.

Figure 3A:
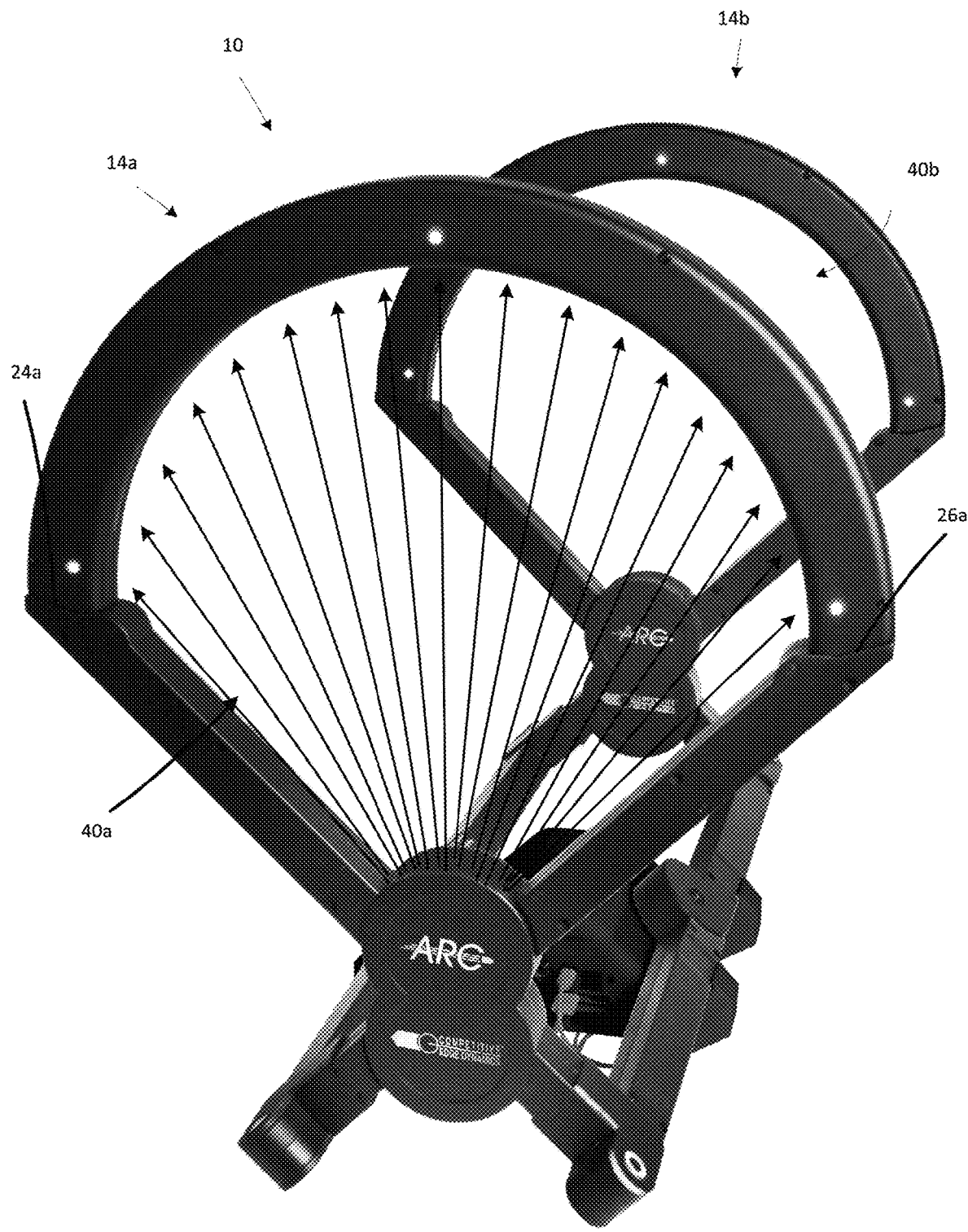
FIG. 3A is a front perspective view of the ballistics apparatus shown in FIG. 1 with a diagram of a wall of light superimposed thereon
Figure 3B:
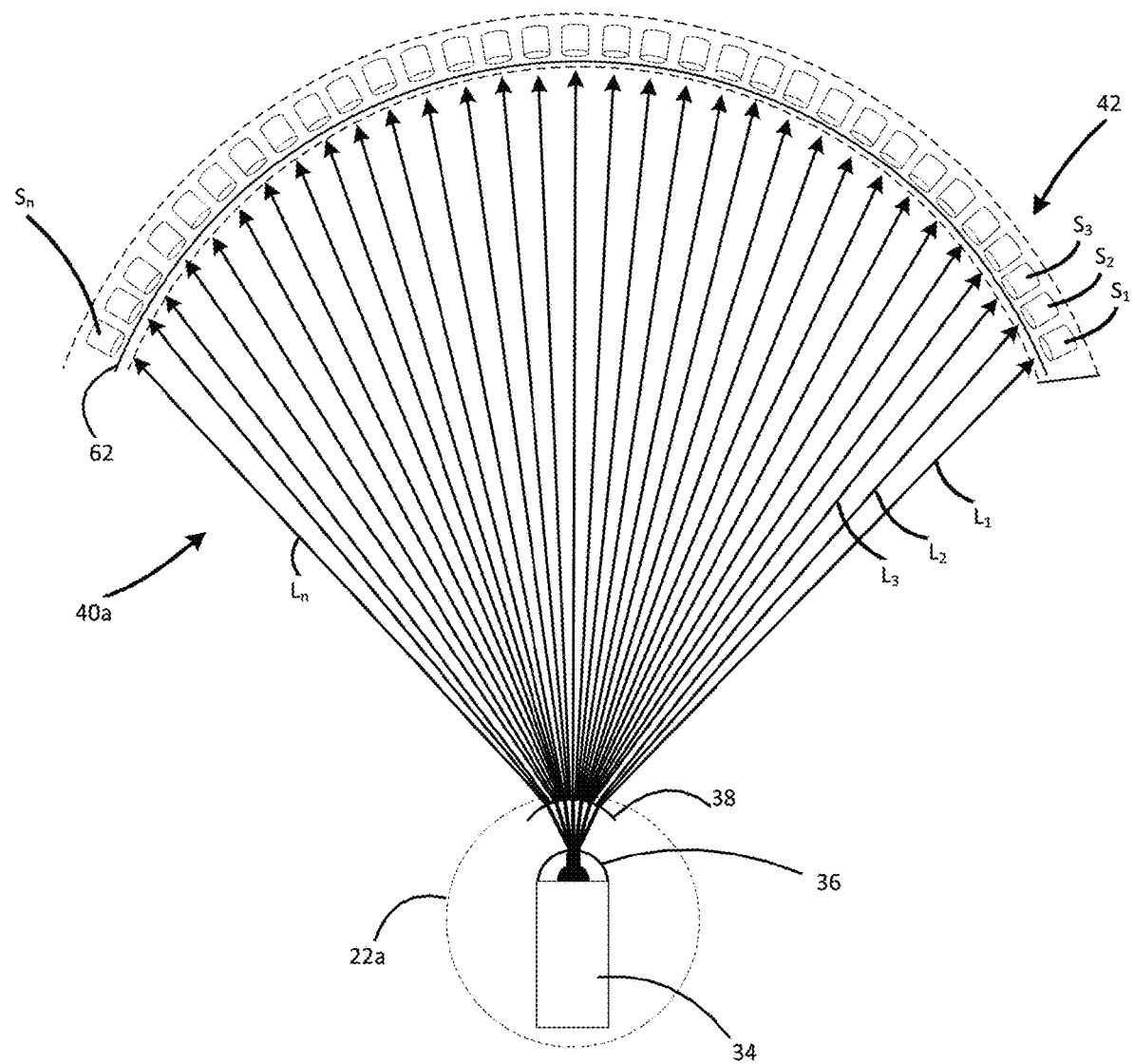
FIG. 3B is a diagram of an LED laser, sensor array, and plurality of diffusers used in the ballistics apparatus shown in FIG. 3 creating a wall of light in accordance with an embodiment of the present invention.

Referring to FIGS. 3A and 3B, the front gate includes an infrared LED laser 34 (see FIG. 3B) located in the front disc-shaped joint 22a. At least one diffuser (see the dome-shaped diffuser 36 and arcuate diffuser 38 diagrammatically shown in FIG. 3B) is positioned over the light path of the LED laser 34 so as to diffuse the light emitting from the LED laser 34 in a wide arc, preferably at least 160°, creating a fan-shaped wall of light 40a that extends to the front arcuate arm 28a, as depicted in FIG. 3A. The front arcuate arm 28a includes a plurality of infrared light sensors $S_1$-$S_n$ that are positioned along the inner arc of the front arcuate arm 28a and facing downward toward the front disc-shaped joint 22a of the front V-shaped stand 16a, creating a downward-facing sensor array 42. The sensor array 42 is configured to receive the diffused laser light emitting from the LED laser 34 in the front disc-shaped joint 22a at a plurality of angles and are configured to register when a break in the wall of light 40a occurs as a result of a projectile passing through the front gate 14a. When a break is registered, the sensor array 42 sends a signal in the form of a voltage spike to the base, indicating that a projectile has passed through the front gate. The front arcuate arm 28a also includes a plurality of notification lights (see left notification light 44a, center notification light 46a, and right notification light 48a) which are configured to emit one color (e.g., green) when the front gate 14a is operable and the wall of light 40a is intact, and a second color (e.g., red) when the wall of light 40a has been broken by a projectile.

As seen in FIGS. 1 and 2, in one embodiment, the base 12 includes two base bars (a left base bar 50 and a right base bar 52) that run parallel to each other and are separated by a fixed distance to provide lateral stability to the ballistics apparatus 10. In addition, the ballistics apparatus 10 includes a cradle 54 on which the left and right base bars 50, 52 sit to provide additional stability. In one embodiment, the cradle 54 includes two left side seats 56a, 56b that protrude from the left side of the cradle 54 and two right side seats 58a, 58b that protrude from the right side of the cradle 54, the left and right side seats 56a, 56b, 58a, 58b being sized and shaped to interface with the left and right base bars 50, 52, respectively. In one embodiment, the left and right side seats 56a, 56b, 58a, 58b include electrical contacts on their surfaces which abut the left and right base bars 50, 52, and the left and right base bars 50, 52 likewise include electrical contacts on their undersides that correspond in size and location to the contacts of the left and right side seats 56a, 56b, 58a, 58b of the cradle 54. These electrical contacts provide physical and electrical connectivity between the base 12 and the cradle 54 when the cradle 54 is attached to the base 12.

The cradle 54 houses a chronograph processor (not shown) that electrically connects to the base 12 and receives signals sent from both the front gate 14a and the rear gate 14b indicating when a projectile has passed through the corresponding gate. The chronograph processor then calculates the time elapsed between the projectile passing through the front gate 14a and the projectile passing through the rear gate 14b and uses this calculation, along with the distance between the front gate 14a and the rear gate 14b, to determine the speed of the projectile.

Operation of the LED Laser and Sensor Array

Referring to FIGS. 3A and 3B, the LED laser 34 housed in the front disc-shaped joint 22a of the front V-shaped stand 16a is positioned to emit an infrared laser upward. This laser light is intercepted by a dome-shaped diffuser 36 positioned in the front disc-shaped joint 22a above the LED laser 34, causing the light of the LED laser 34 to diffuse in multiple directions. In one embodiment, the front disc-shaped joint 22a is equipped with a second, arcuate diffuser 38 screen that serves to further diffuse the laser light and to protect the interior of the front disc-shaped joint 22a from debris, moisture, and other unwanted items which would interfere with the LED laser 34. The dome-shaped diffuser 36 and the arcuate diffuser 38 are configured to diffuse the laser light of the LED laser 34 along a single arc, causing the laser light to spread into laser beam segments $L_1$-$L_n$ along a plurality of vectors within a single vertical plane, creating a fan-shaped wall of light 40a emitting from the front disc-shaped joint 22a.

Figure 17:
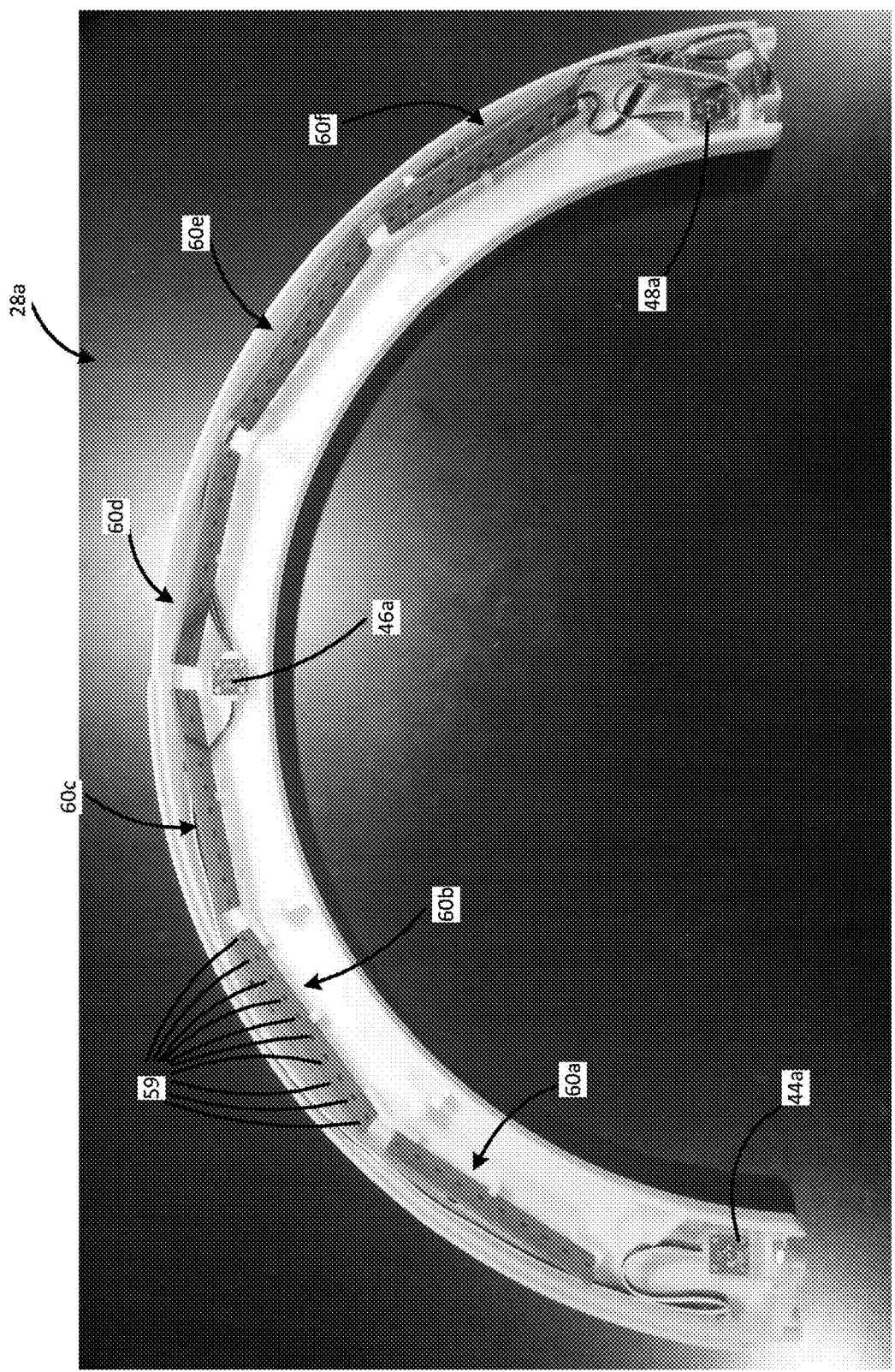
FIG. 17 is a front elevational view of an arcuate arm of the ballistics apparatus shown in FIG. 1 with a portion of the outer surface removed, exposing the inner parts thereof.

Referring to FIG. 17, the front arcuate arm 28a sitting above the front V-shaped stand 16a includes a plurality of infrared light sensors $S_1$-$S_n$, preferably LED sensors (see LED sensors 59), set in printed circuit boards ("PCBs"; see PCBs 60a-60f) which are arranged in an arcuate array along the circumference of the front arcuate arm 28a. The light sensors in the sensor array 42 are configured to face toward the front disc-shaped joint 22a of the front V-shaped stand 16a when the front arcuate arm 28a is sitting upon the left and right distal ends 24a, 26a of the front V-shaped stand 16a, thereby receiving the diffused light emitting from the LED laser 34 through the dome-shaped diffuser 36 and the arcuate diffuser 38. The sensor array 42 is electrically connected to the chronograph processor through the electrical contact on the right end 32a of the front arcuate arm 28a, as seen in FIG. 17 which connects to a corresponding electrical contact in the right distal end 26a of the front V-shaped stand 16a. These contacts allow any signals produced by the sensor array 42 to be communicated to the chronograph processor.

In one embodiment, the front arcuate arm 28a includes an acrylic diffuser screen 62 that spans the area of the sensor array 42 and intersects the laser light emitting from the LED laser 34 to the sensor array 42. The acrylic diffuser screen 62 serves to enhance the laser light emitted from the LED laser 34 and to protect the sensor array 42 from debris, moisture, and other environmental elements which would interfere with the sensor array 42. In one embodiment, the acrylic diffuser screen 62 enhances the laser light by narrowing portions of the laser beam segments $L_1$-$L_n$ into the LED sensors $S_1$-$S_n$ of the sensor array 42. In another embodiment, the acrylic diffuser screen 62 operates to enhance the laser light by further diffusing the laser beam segments $L_1$-$L_n$ so that the LED sensors $S_1$-$S_n$ receive more light from a wider area of incoming diffused light.

During operation, the light emitting from the LED laser 34 is channeled into the sensor array 42 to create the plurality of laser beam segments $L_1$-$L_n$ that form the wall of light. The sensor array 42 is configured to register whether an object has crossed the path of one of the laser beam segments $L_1$-$L_n$ when at least one of the sensors $S_1$-$S_n$ within the sensor array 42 ceases receiving a predetermined percentage of laser light normally received from the LED laser 34 while other sensors continue to receive such laser light. Such an event is considered a "break" in the wall of light 40a of the front gate 14a.

When a break in the front gate 14a occurs, the front arcuate arm 28a sends a voltage spike through the circuitry of the front gate 14a to the chronograph processor in the cradle 54 to indicate that the front gate 14a has been broken, allowing the chronograph processor to record the event and initiate a timer. When a break occurs in the rear gate 14b, a similar voltage spike is sent from the rear arcuate arm 28b of the rear gate 14b to the chronograph processor, which registers the event and stops the timer. From there, the chronograph processor can calculate the speed of the projectile based on the time difference between the two breaks, the distance between the front gate 14a and the rear gate 14b, and the assumed trajectory of the projectile being substantially perpendicular to the respective walls of light 40a, 40b of the front gate 14a and the rear gate 14b. In addition, the left, center, and right notification lights 44a, 46a, 48a in the front arcuate arm 28a of the front gate 14a change color (e.g., from green to red) when a break in the front gate 14a occurs, and likewise for the rear gate 14b.

The "density" of the wall of light 40a (i.e., the amount of surface area covered by laser beam segments $L_1$-$L_n$ compared to the entire surface area of the wall of light 40a) depends on the size and length of the front arcuate arm 28a and front gate 14a, the diffusion angles of the dome-shaped diffuser 36 and the arcuate diffuser 38, and the number and arrangement of LED sensors $S_1$-$S_n$ in the sensor array 42 positioned along the front arcuate arm 28a. As one would expect, the higher the density of laser light, the less likely a projectile is to pass through the front gate 14a without crossing the path of at least one of the laser beam segments $L_1$-$L_n$. In one embodiment, the dome-shaped diffuser 36 is configured to diffuse light from the LED laser 34 in a 160° arc and the front arcuate arm 28a includes 60 LED sensors in its sensor array, as shown in FIG. 23.

In one embodiment, the LED laser 34 emits light within a narrow, predetermined frequency band for the purpose of eliminating the possibility of outside light-based interference adversely affecting the ability of the sensor array 42 to register breaks.

Measurement Processing

Figure 16:
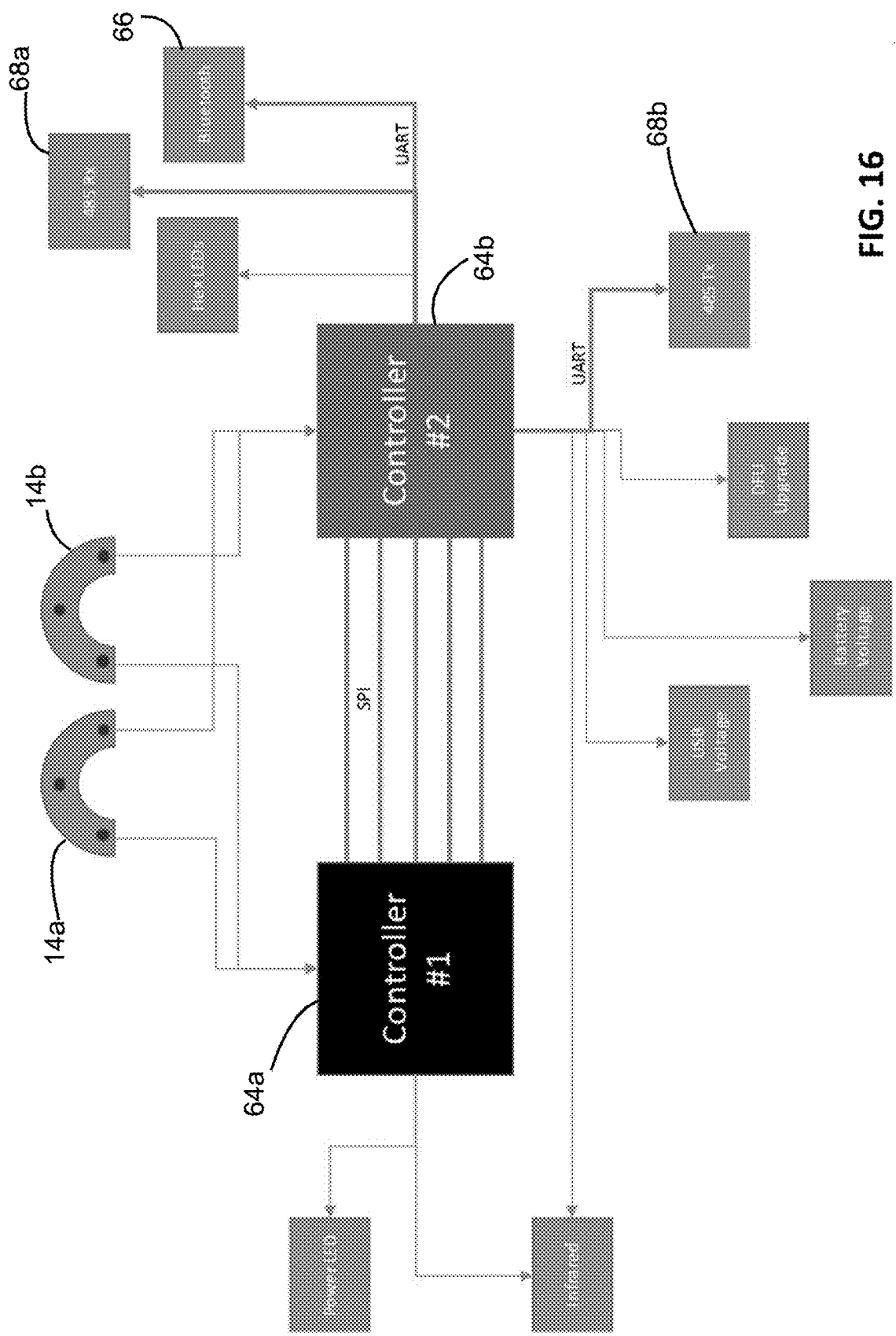
FIG. 16 is a diagram of the microcontrollers in the chronograph processor of the ballistics apparatus shown in FIG. 1.

The chronograph processor of the ballistics apparatus 10 includes two digital controllers 64a, 64b to calculate measurements from the front and rear gates 14a, 14b. These digital controllers 64a, 64b run independently from each other and operate to check and counter-check each other to ensure the ballistics apparatus 10 is operating optimally. In one embodiment, this arrangement enables the ballistics apparatus 10 to record up to 120 velocities per minute with a range as low as 30 feet per second and as high as 9,000 feet per second. FIG. 16 illustrates the digital controllers 64a, 64b and their connections to the various parts of the ballistics apparatus 10.

In one embodiment, the cradle 54 includes one or more communication ports that allow the ballistics apparatus 10 to be connected to a second ballistics apparatus (not shown), enabling multiple ballistics apparatuses to be daisy-chained to determine the velocity of a projectile at multiple locations along a long projectile trajectory. In one embodiment, two of the ballistics apparatus 10 can be daisy-chained to measure velocity along a trajectory as long as 100 meters.

In one embodiment, the cradle 54 includes a wireless transmitter 66 to transmit calculations from the chronograph processor to a remote device, such as a handheld electronic device. In another embodiment, the cradle 54 includes a plurality of data ports 68a, 68b for communicating with and storing recorded data on a memory device, such as an SD card or a flash drive, and/or displaying such data on a display screen.

Figure 13:
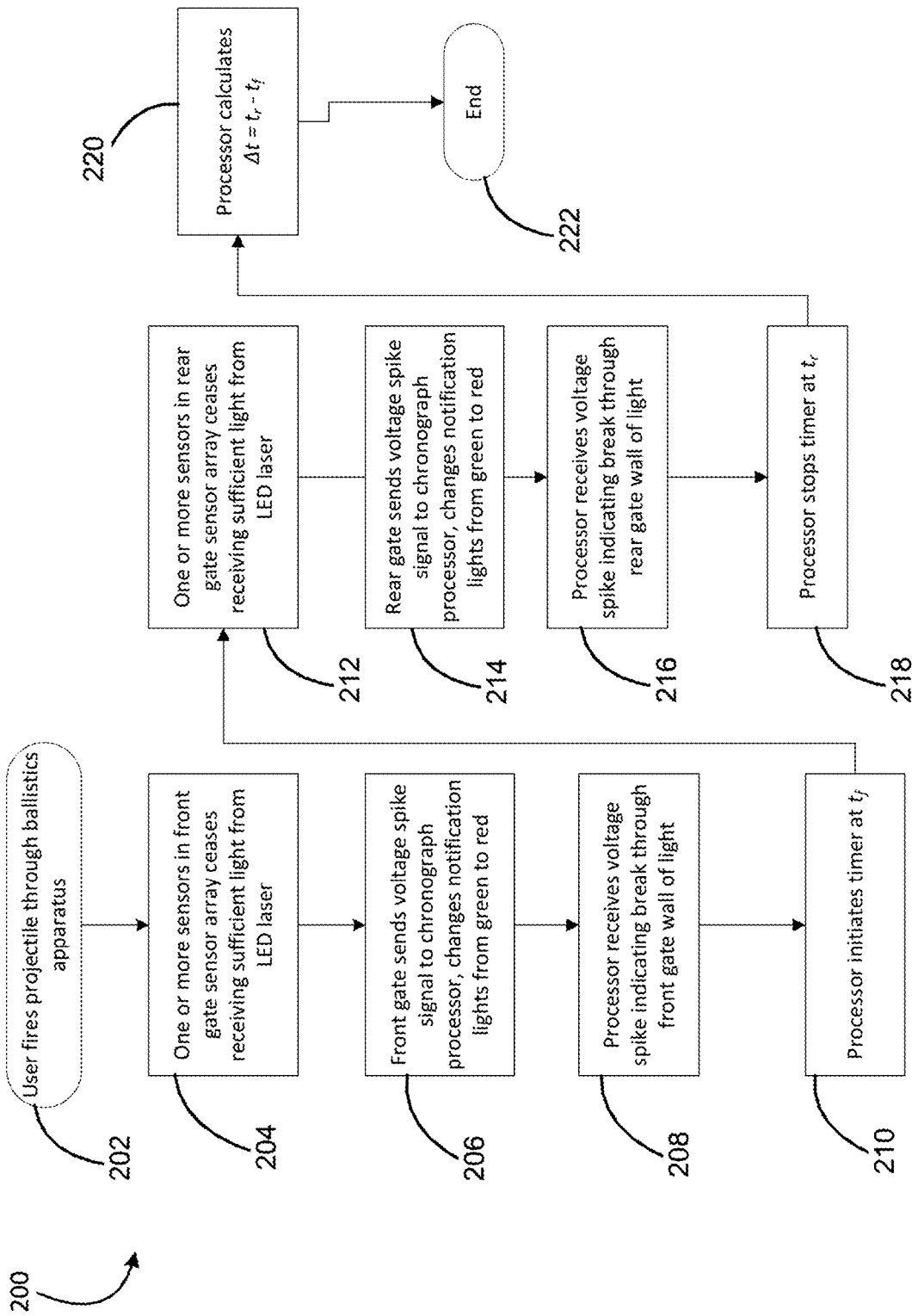
FIG. 13 is a flow chart illustrating the ballistic projectile sensing and signal comparison process performed by the ballistics apparatus shown in FIG. 1.

FIG. 13 illustrates a process 200 taken by the chronograph processor in determining the timing of a ballistic projectile passing through the front gate 14a and the rear gate 14b. The process 200 begins when a user fires a projectile toward the front gate 14a of the ballistics apparatus 10 (step 202). Once the projectile reaches the wall of light 40a of the front gate 14a, one or more sensors in the sensor array 42 of the front gate 14a ceases receiving a predetermined amount of light from the LED laser 34 of the front gate 14a (step 204), causing the sensor array 42 to experience a break in the wall of light 40a. This break causes the front gate 14a to send a signal to the chronograph processor in the cradle 54 while changing the left, center, and right notification lights 44a, 46a, 48a in the front arcuate arm 28a from green to red to indicate that a break in the front gate 14a has occurred (step 206). The chronograph processor receives the signal from the front gate 14a (step 208) and initiates a timer at $t_f$ (step 210).

Figure 14:
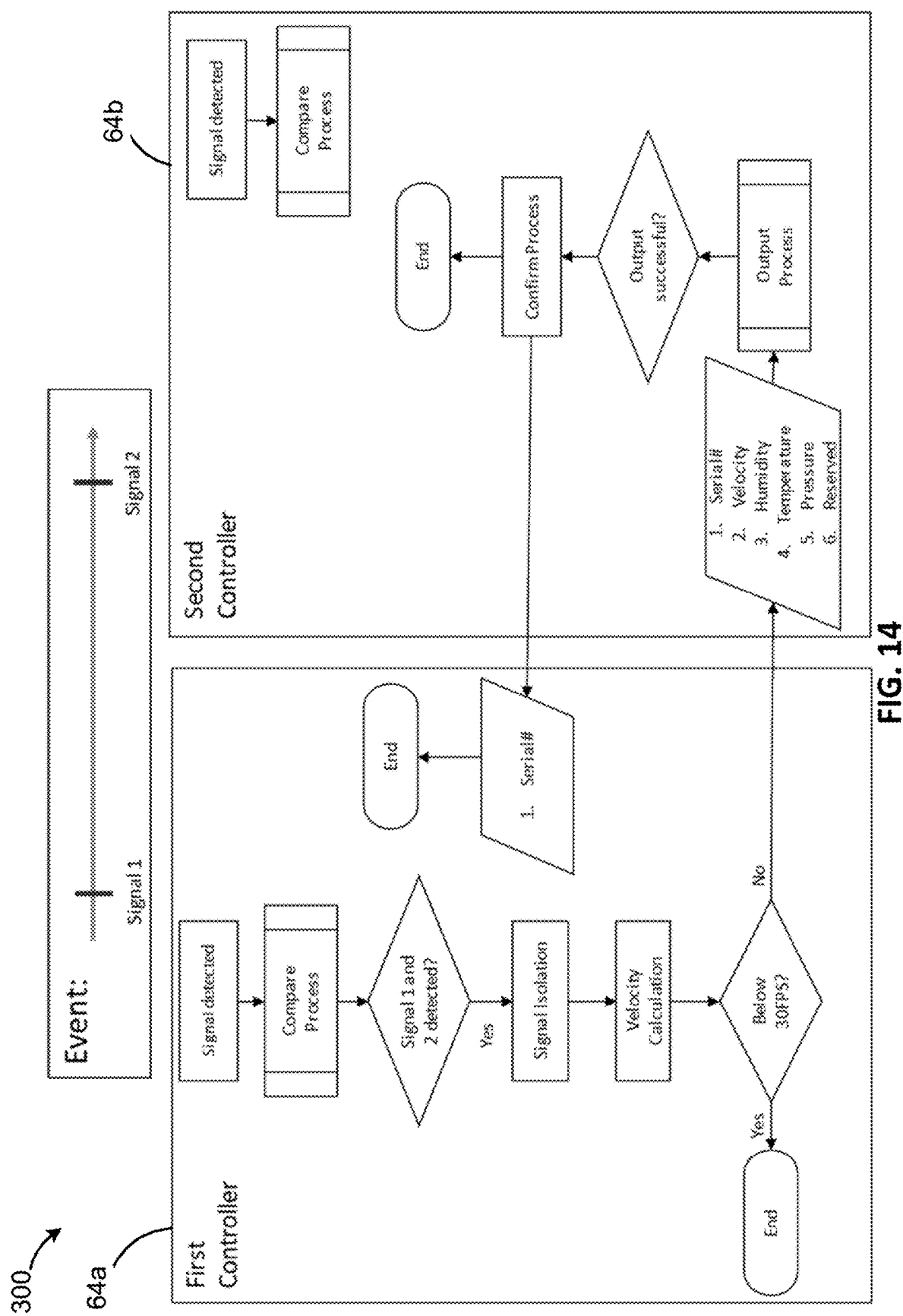
FIG. 14 is a flow chart showing the velocity calculation and checking process of the ballistics apparatus shown in FIG. 1.

Thereafter, the projectile proceeds to the wall of light 40b of the rear gate 14b, causing one or more sensors therein to cease receiving a predetermined amount of laser light (step 212). The rear gate 14b responds by sending a signal to the chronograph processor in the cradle 54 while changing the left, center, and right notification lights 44b, 46b, 48b of the rear arcuate arm 28b from green to red to indicate that a break in the rear gate 14b has occurred (step 214). The chronograph processor receives this signal from the rear gate 14b (step 216) and stops the timer at $t_r$ (step 218). The chronograph processor then calculates the time difference between the break in the front gate 14a and the break in the rear gate 14b (i.e., $t_r$-$t_f$; step 220) before ending the process 200 (step 222). This time difference, along with the distance between the front gate 14a and the rear gate 14b, is then used to calculate the velocity of the projectile. FIG. 14 illustrates the process 300 of the digital controllers 64a, 64b determining the velocity of a ballistic projectile based on the sensing process shown in FIG. 13.

Figure 15:
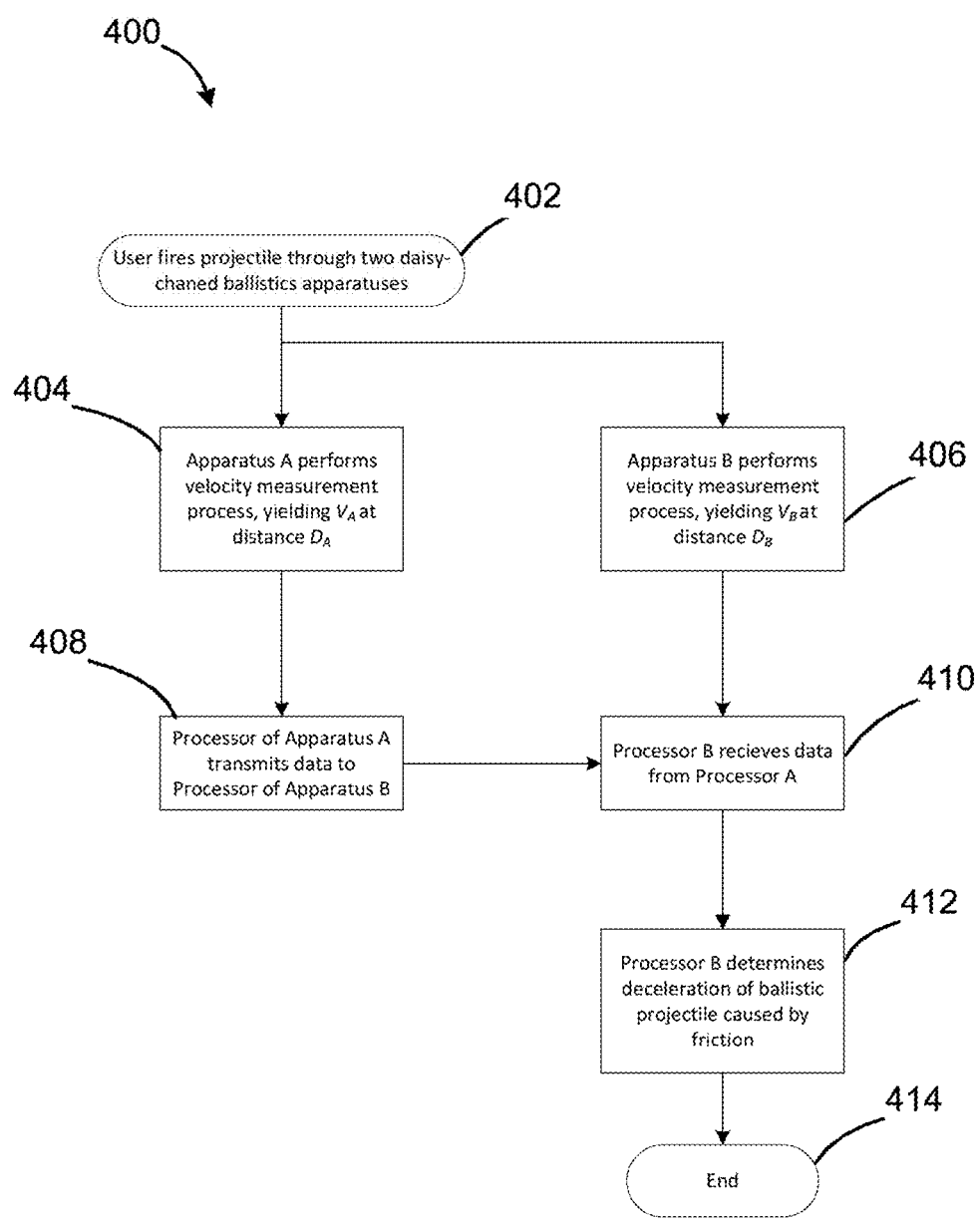
FIG. 15 is a flow chart showing the velocity calculation process at multiple locations performed by two daisy-chained ballistics apparatuses in accordance with an embodiment of the present invention.

FIG. 15 illustrates a process 400 for determining velocity loss due to friction using two daisy-chained ballistics apparatuses. At the outset, a user fires a projectile through two daisy-chained ballistics apparatuses (step 402). The first ballistics apparatus (i.e., "Apparatus A") performs a velocity measurement in the manner discussed above based on the data it measures from the projectile passing therethrough (step 404) and the second ballistics apparatus (i.e., "Apparatus B") performs a velocity measurement based on the data it measures from the projectile passing therethrough (step 406). The chronograph processor of Apparatus A then transfers its data to the processor of Apparatus B (steps 408 and 410), which calculates the deceleration of the projectile based on the difference in the velocities calculated by Apparatus A and Apparatus B and the difference in distance between Apparatus A and Apparatus B (step 412). The process 400 then ends (step 414) with a determination of the deceleration experienced by the projectile due to friction.

Targeting Alignment

In one embodiment, the plurality of notification lights in the front arcuate arm 28a includes three notification lights positioned along the front arcuate arm 28a in a left-most location (see left notification light 44a), an upper central location (see center notification light 46a), and a right-most location (see right notification light 48a) of the front gate 14a. The alignment of the left, center, and right notification lights 44a, 46a, 48a of the front gate 14a, along with the notification of the corresponding left, center, and right notification lights 44b, 46b, 48b of the rear gate 14b, assists a firearm user in ensuring that the projectile fired from the firearm in a direction as close to perpendicular to the vertical planes created by walls of light 40a, 40b in the front and rear gates 14a, 14b, as further discussed below.

Figure 4A:
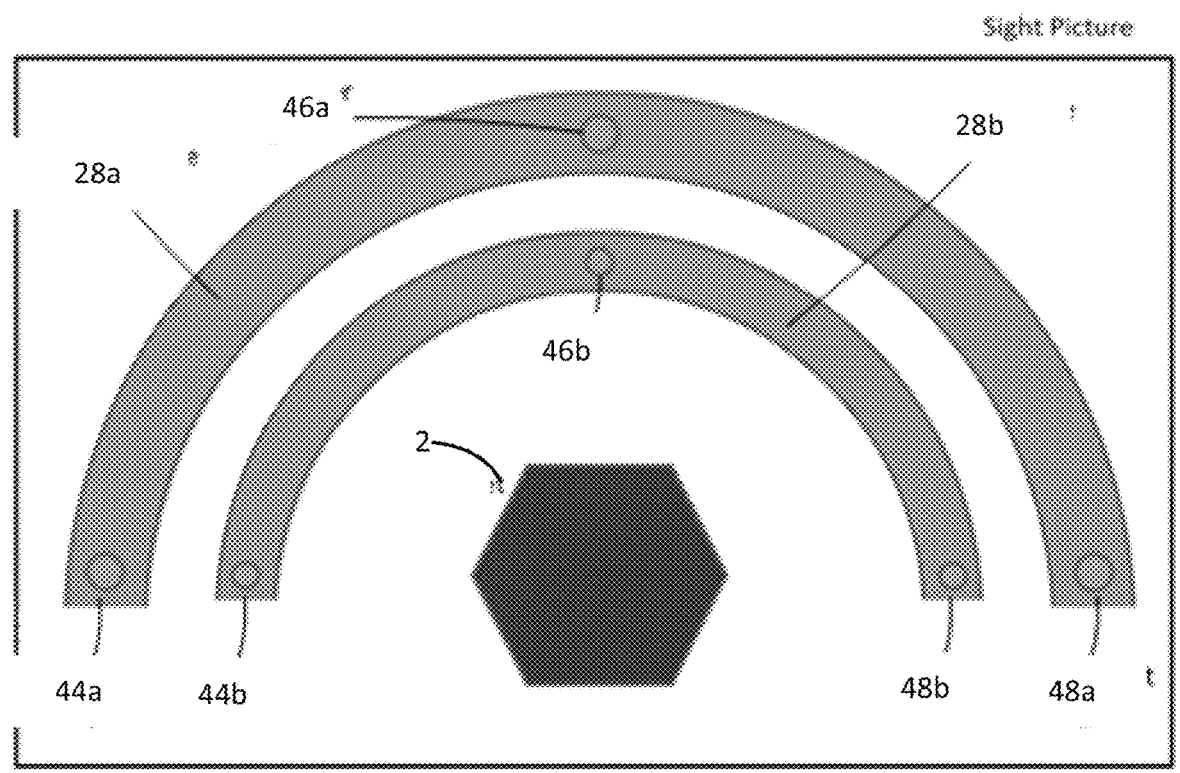
FIG. 4A is a schematic view of a user looking through the front gate of the ballistics apparatus shown in FIG. 1.
Figure 4B:
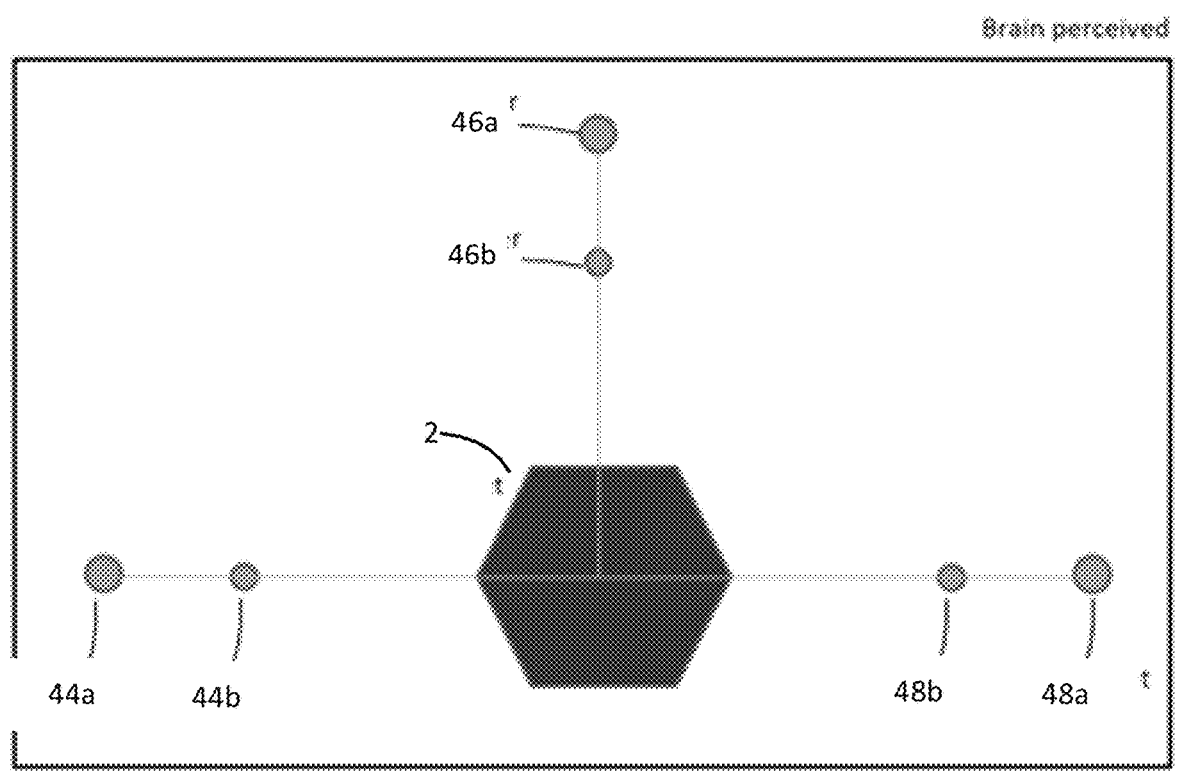
FIG. 4B is the schematic view of FIG. 4A with the arcuate arms of the ballistics apparatus not shown.

As seen in FIG. 2, when the user looks down the sight of the firearm and into the front and rear gates 14a, 14b of the ballistics apparatus 10, the user can align the firearm such that the rear arcuate arm 28b of the rear gate 14b appears as a smaller crescent that is concentrically aligned with the larger crescent depicted by the front arcuate arm 28a of the front gate 14a. As seen in FIGS. 4A and 4B, the user can align the sight of the firearm such that when looking down the sight toward a target 2, the center notification light 46a of the front gate 14a creates a vertical line with the center notification light 46b of the rear gate 14b, the left notification light 44a of the front gate 14a creates a horizontal line with the left notification light 44b of the rear gate 14b, and the right notification light 48a of the front gate 14a creates a horizontal line with the right notification light 48b of the rear gate 14b. This arrangement of the notification lights of the front gate 14a and the notification lights of the rear gate 14b creates an alignment trajectory in the eyes of the user similar to crosshairs, the center of which being the target 2 where the firearm should aim. Doing so provides the user with assurance that his/her firearm is positioned "dead-center" and as close to perpendicular to the front and rear gates 14a, 14b as possible.

Apparatus Assembly

Figure 5:
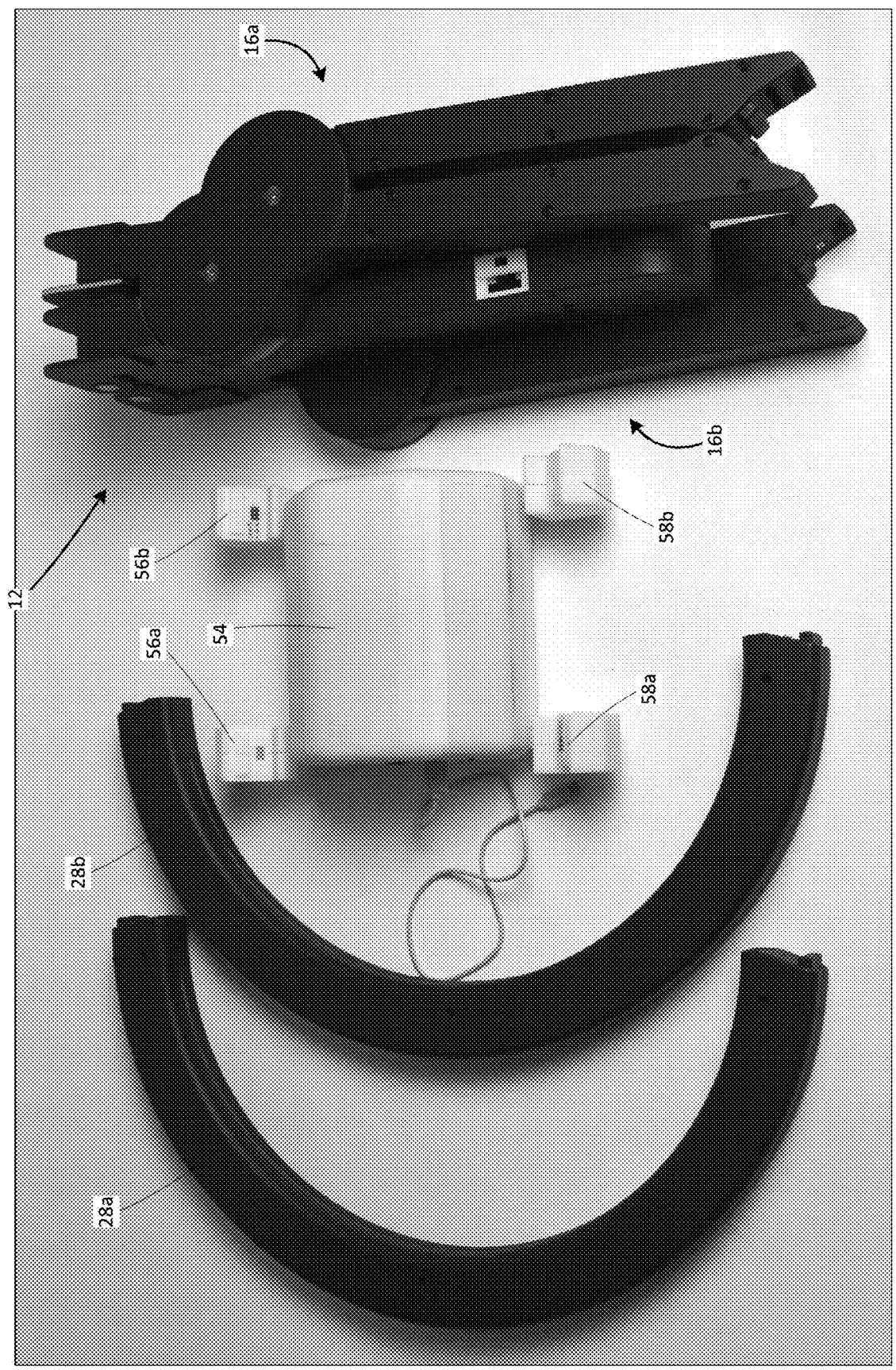
FIG. 5 is a top view of the ballistics apparatus shown in FIG. 1 in a disassembled condition.

In one embodiment, the ballistics apparatus 10 is configured to collapse into a storage configuration, as seen in FIG. 5, and expand into an upright, operating configuration, as seen in FIGS. 1 and 2, using all right-angled hinges. More particularly, the front and rear V-shaped stands 16a, 16b include left and right foot extensions 70a, 72a, 70b, 72b which are hingedly attached to the left and right base bars 50, 52, respectively, with the left and right foot extensions 70a, 72a of the front V-shaped stand 16a being located at the front end 12a of the base 12 and the left and right foot extensions 70b, 72b of the rear V-shaped stand 16b being located at the rear end 12b of the base 12. Each of the left and right base bars 50, 52 is separated into a front base section (see left and right front base sections 73a, 74a) and a rear base section (see left and right rear base sections 73b, 74b), with the front base section being attached to the rear base section at a center base hinge (see left and right center base hinges 76, 78).

Figure 8:
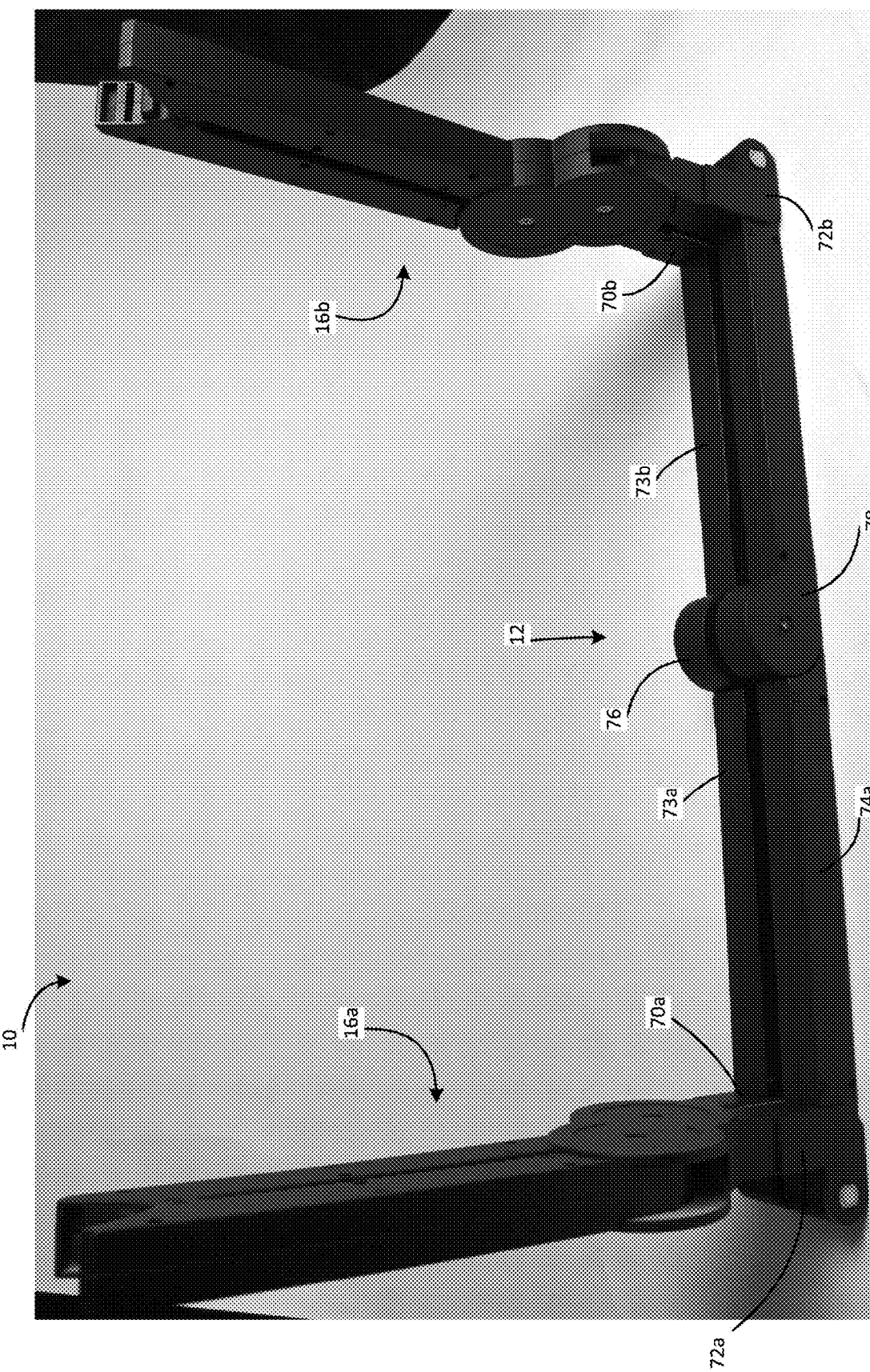
FIG. 8 is a side perspective view of the combined base, front stand and rear stand part shown in FIG. 6 in an erected position.
Figure 9:
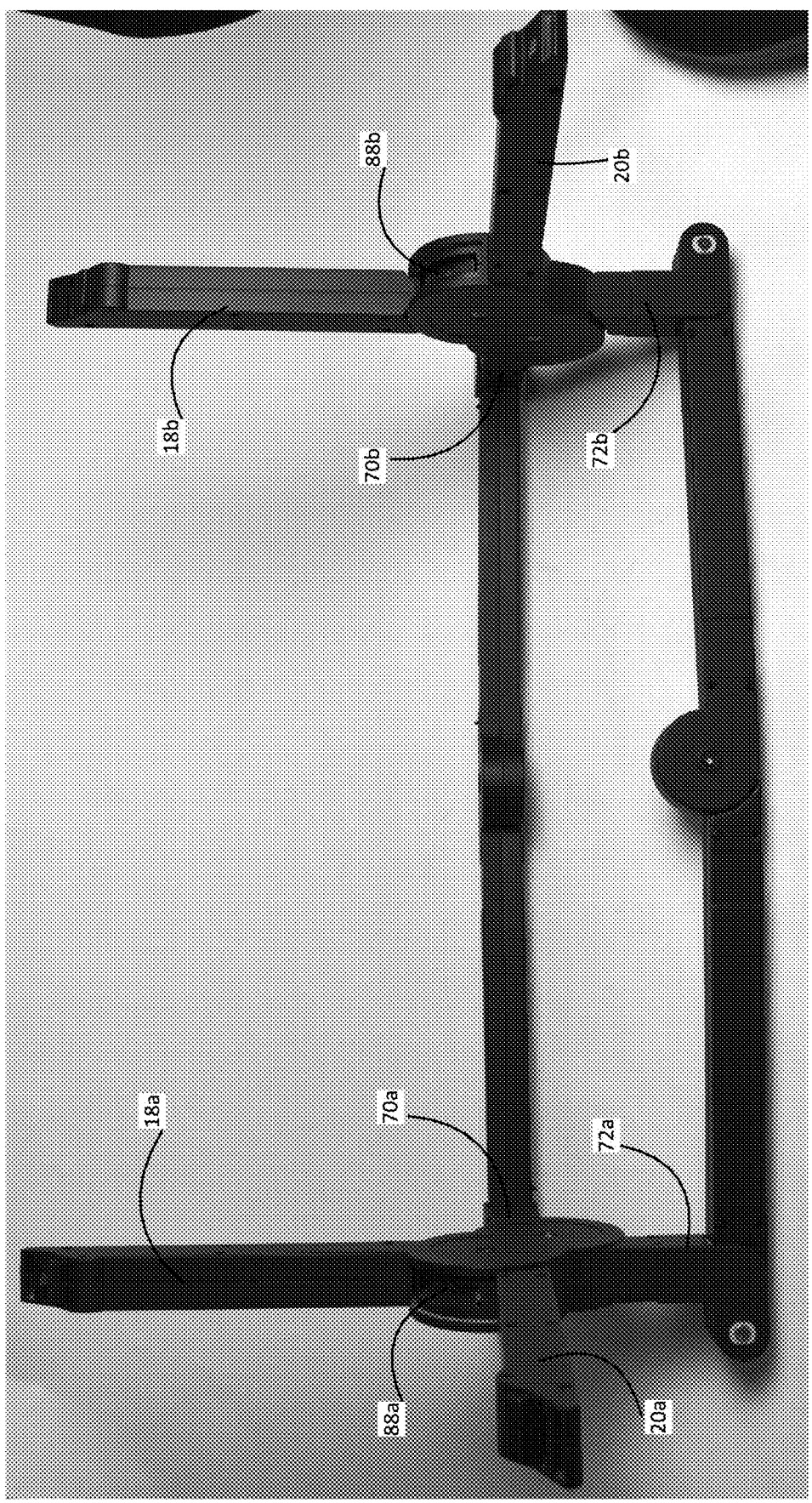
FIG. 9 is the view of FIG. 8 with the combined base, front stand and rear stand part in an erected and expanded position.
Figure 10:
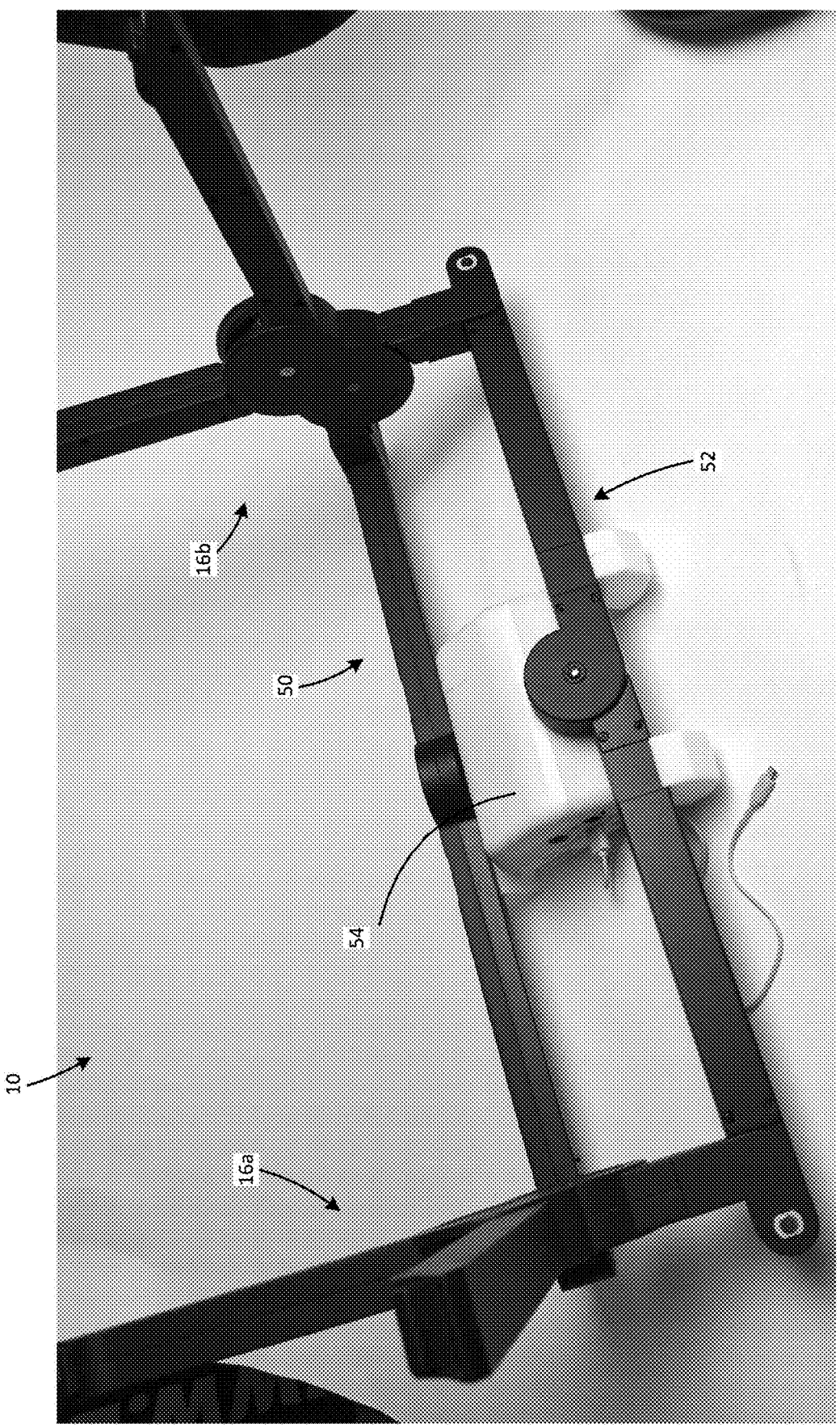
FIG. 10 is a perspective view of the combined base, front stand and rear stand part shown in FIG. 9 with the cradle attached.

The left and right front and rear foot extensions 70a, 72a, 70b, 72b are right-angle hinges sized and shaped to ensure that, when the ballistics apparatus 10 is in its operating configuration, the front and rear V-shaped stands 16a, 16b are oriented perpendicular to the surface on which the base 12 sits. More particularly, the left and right front and rear foot extensions 70a, 72a, 70b, 72b include grooves (see left front groove 80a, right front groove 82a, left rear groove 80b, and right rear groove 82b) that are sized and shaped to interface with the left and right base bars 50, 52, respectively. Each of the left and right front grooves 80a, 82a and the left and right rear grooves 80b, 82b has a floor (see left and right front floors 84a, 86a; left and right rear floors not visible) that serves as a stop member to prevent the corresponding V-shaped stand (see front V-shaped stand 16a and rear V-shaped stand 16b) from over-rotating, thereby ensuring that the V-shaped stand is positioned perpendicular to the horizontal surface on which the base 12 stands, as seen in FIGS. 8 and 9. Each of the left and right center base hinges 76, 78 is a 180 degree hinge sized and shaped to ensure that, when the ballistics apparatus 10 is in its operating configuration, the front and rear base section of the base 12 are collinearly aligned (i.e., left front base section 73a is collinearly aligned with left rear base section 73b; right front base section 74a is collinearly aligned with the right rear base section 74b and the front and rear V-shaped stands 16a, 16b are set a predetermined distance apart (i.e., the length of the base 12).

Figure 6:
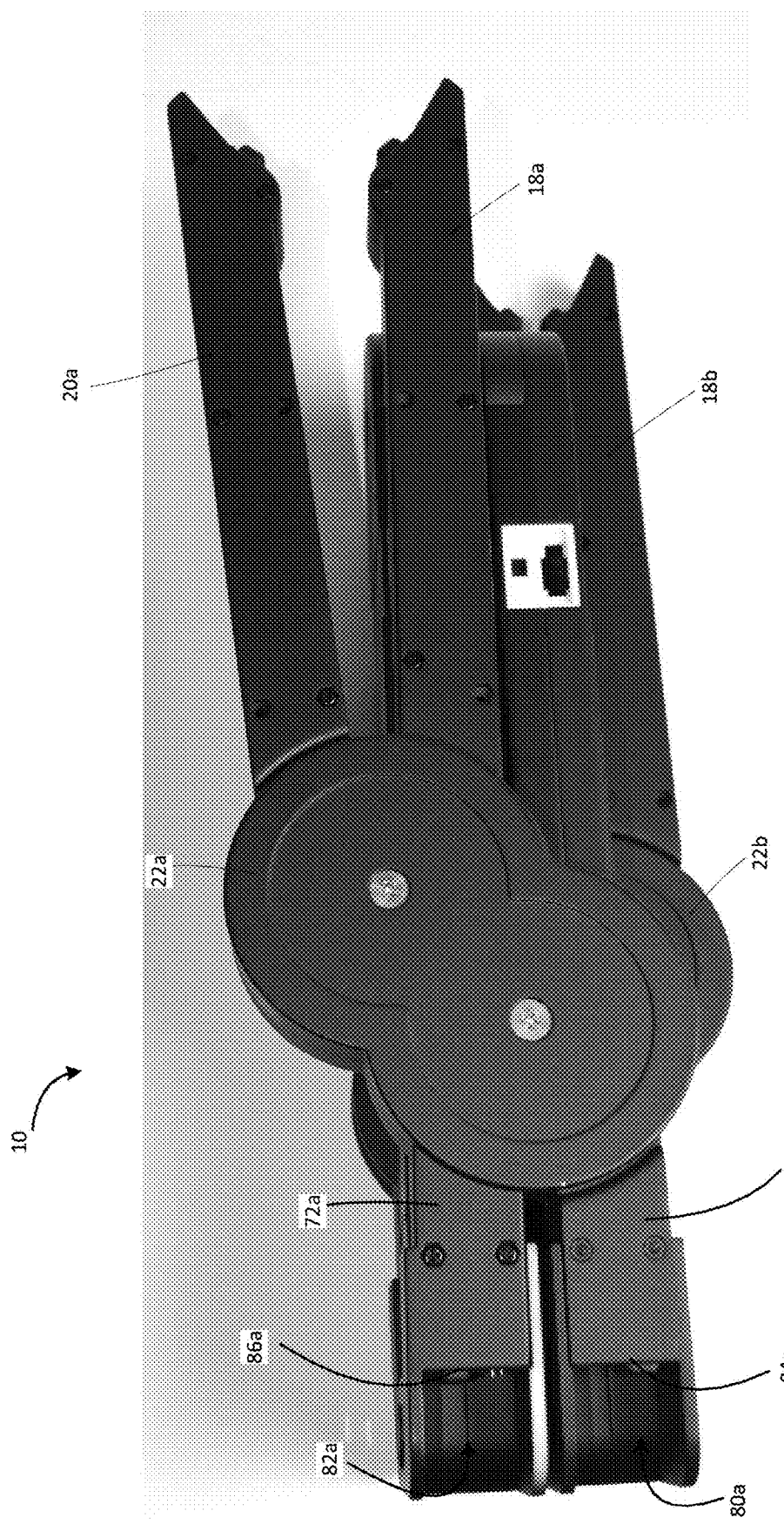
FIG. 6 is a top view of the combined base, front stand and rear stand part of the ballistics apparatus shown in FIG. 1 in a collapsed position.

As seen in FIG. 6, in one embodiment, the front and rear disc-shaped joints 22a, 22b of the front and rear V-shaped stands 16a, 16b includes a hinge which connects the left leg of the stand to the right leg of the stand (see left and right front legs 18a, 20a and left and right rear legs 18b, 20b) and allows the left and right legs to collapse toward each other such that their inner surfaces abut, allowing for a more compact configuration for storage. More particularly, each of the front and rear disc-shaped joints 22a, 22b is integrally connected to one of its respective left and right legs (i.e., the left front leg 18a is integrally connected to the front disc-shaped joint 22a of the front V-shaped stand 16a; the right rear leg 20b is integrally connected to the rear disc-shaped joint 22b of the rear V-shaped stand 16b) and includes a slot (see front slot 88a and rear slot 88b) to house the proximal end of the other of the left and right legs (i.e., the right front leg 20a for the front V-shaped stand 16a and the left rear leg 18b for the rear V-shaped stand 16b), allowing the slotted leg to pivot about the hinge of the disc-shaped joint. The front and rear slots 88a, 88b of the front and rear disc-shaped joints 22a, 22b have stop ends configured to inhibit rotation of the slotted legs (i.e., the right front leg 20a and left rear leg 18b) beyond a predetermined angle. In one embodiment, the front and rear slots 88a, 88b prevent the right front leg 20a and the left rear leg 18b from rotating beyond 160 degrees from the left front leg 18a and the right rear leg 20b, respectively. When the right front leg 20a and left rear leg 18*b* abut the stop ends of the front and rear slots 88*a*, 88*b*, respectively, the front and rear slots 88*a*, 88*b* create openings for the LED lasers (see LED laser 34) in the front and rear disc-shaped joints 22*a*, 22*b* to shine upward and create the front and rear walls of light 40*a*, 40*b*.

Figure 7:
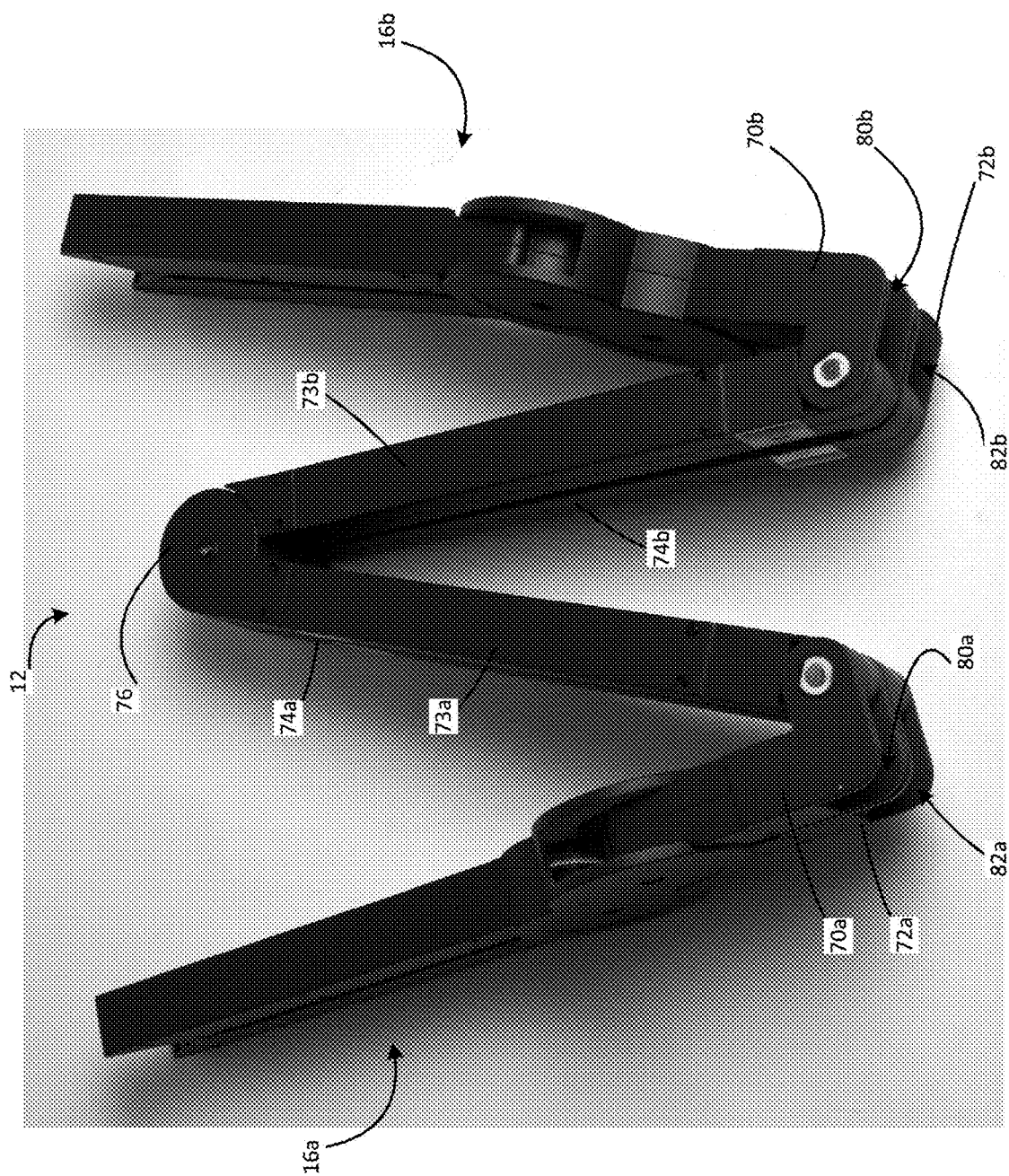
FIG. 7 is a side elevational view of the combined base, front stand and rear stand part shown in FIG. 6 in a partially collapsed position.
Figure 11:
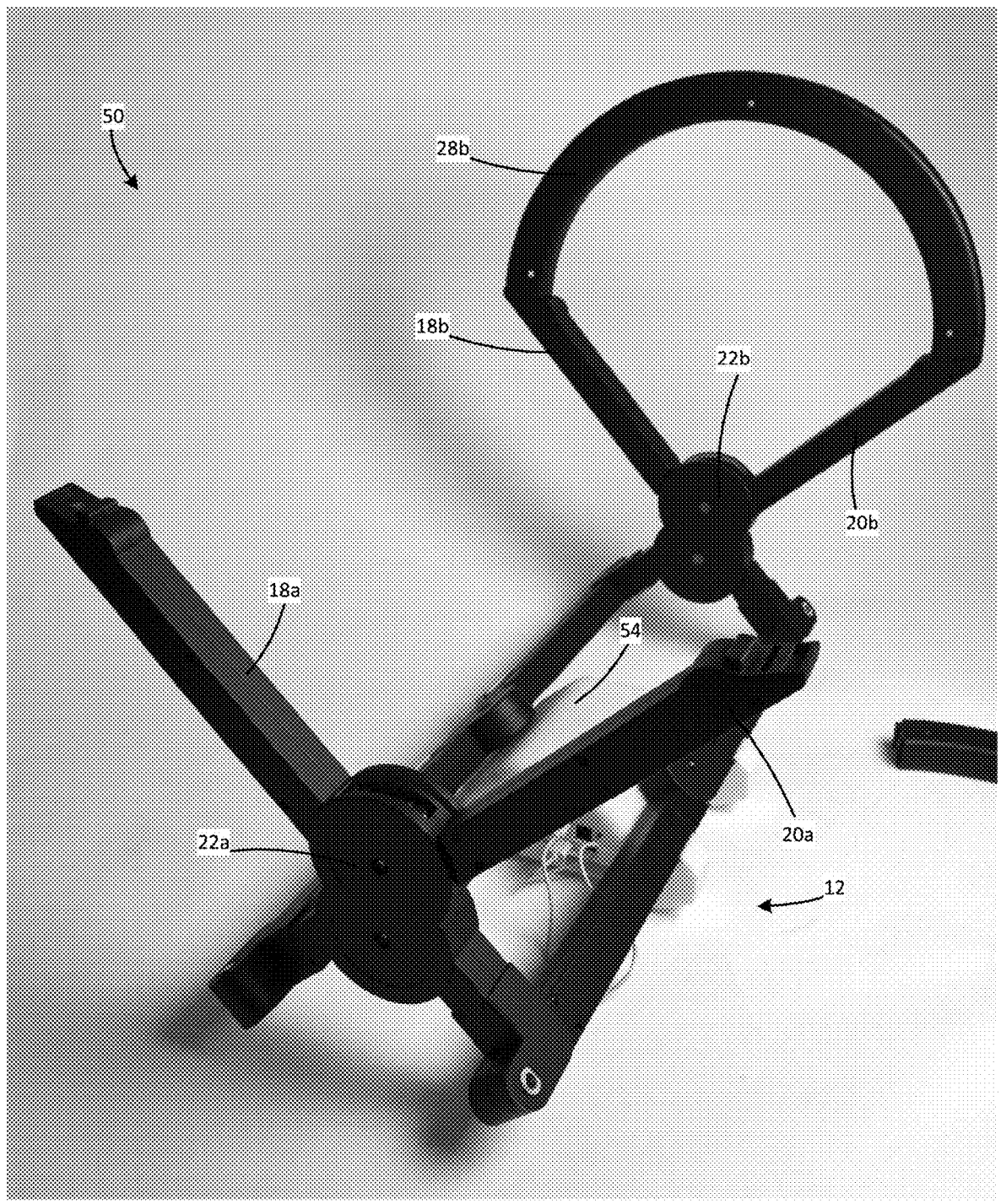
FIG. 11 is a front perspective view of the combined base, front stand and rear stand part shown with the rear arcuate arm attached to the rear stand.
Figure 12:
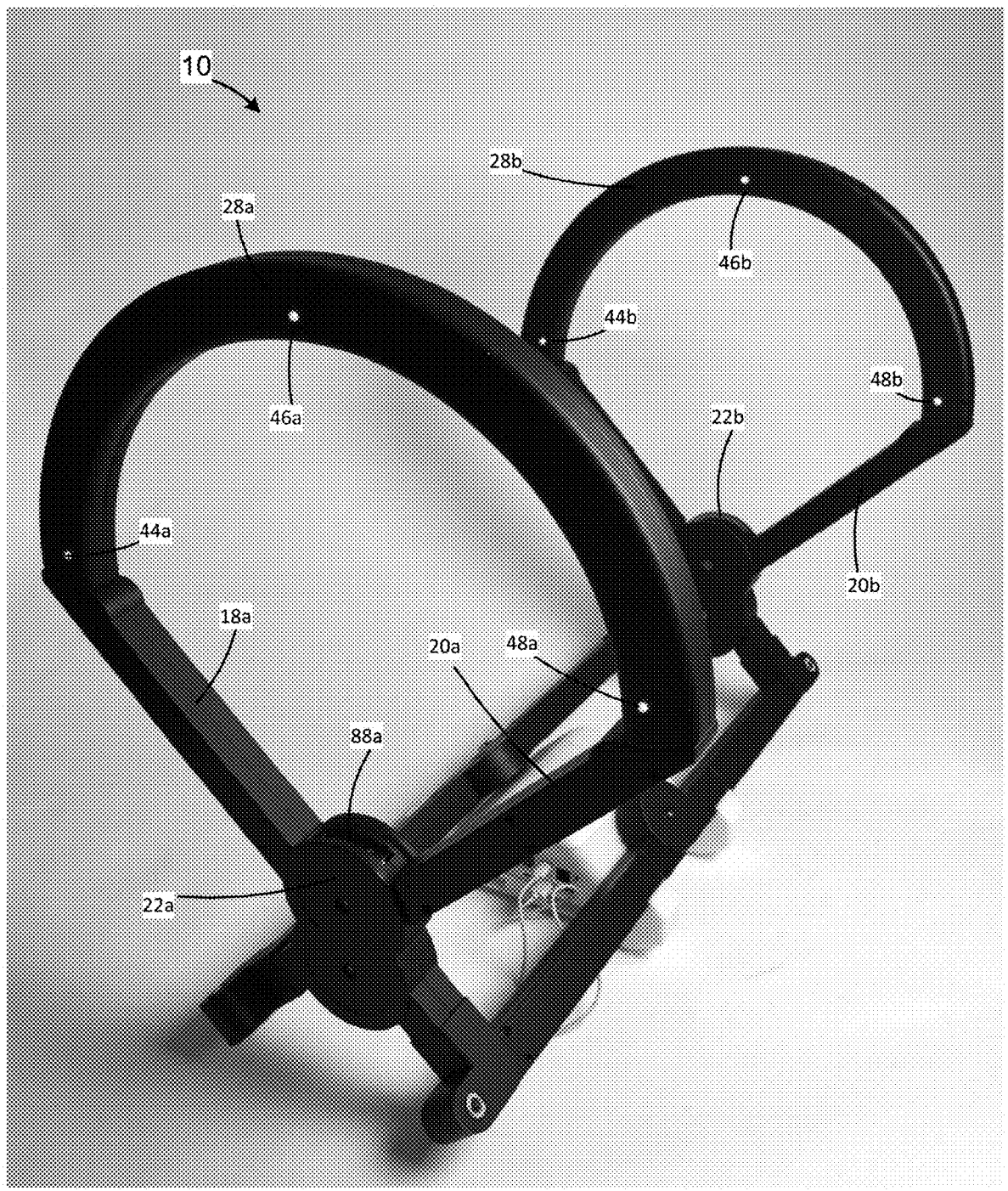
FIG. 12 is a front perspective view of a fully assembled ballistics apparatus constructed in accordance with an embodiment of the present invention.

The assembly process of the ballistics apparatus 10 is illustrated in FIGS. 6-12. Assembly begins by unfolding the base 12, front V-shaped stand 16*a* and rear V-shaped stand 16*b* from a collapsed position, rotating the front and rear base sections 73*a*, 74*a*, 73*b*, 74*b* of the base 12 about the left and right center base hinges 76, 78 until the front and rear base sections are colinearly aligned. The front and rear V-shaped stands 16*a*, 16*b* are then rotated 270 degrees about the left and right front foot extensions 70*a*, 72*a* and the left and right rear foot extensions 70*b*, 72*b*, respectively, causing the floors of the grooves in the foot extensions of each of the front and rear stands to abut the upward-facing surfaces of the front and rear base sections, respectively. This arrangement ensures that the front and rear V-shaped stands 16*a*, 16*b* are parallel to each other and perpendicular to the surface on which the base sits, as seen in FIG. 7. As seen in FIG. 8, the legs of the front and rear stands are then expanded, rotating the slotted legs about the respective disc-shaped joints until they reach their predetermined angle (e.g., 160°). The base 12 of the ballistics apparatus 10 is then connected to the cradle 54 which, in this embodiment, serves as a stand for the base 12 of the ballistics apparatus 10. As seen in FIGS. 11 and 12, the front and rear arcuate arms 28*a*, 28*b* are then attached to the front and rear V-shaped stands 16*a*, 16*b*, respectively. Electrical connectivity between the front and rear arcuate arms 28*a*, 28*b* and the cradle 54 can be verified by the illumination of the left, center, and right notification lights 44*a*, 46*a*, 48*a* on the front arcuate arm 28*a* and the left, center, and right notification lights 44*b*, 46*b*, 48*b* on the rear arcuate arm 28*b*.

Advantages Over the Prior Art

The ballistics apparatus 10 of the present invention has several advantages over prior art apparatuses which use optical sensors. First, the ballistics apparatus prevents light-based variables such as glare reflected from a surface positioned below the ballistics apparatus from producing errors, which are a common problem amongst state of the art chronographs that sense shadow movement. Second, the ballistics apparatus 10 eliminates detection issues involving small, fast projectiles, which many optical diode sensors have difficulty detecting accurately. Third, chronographs which use optical sensors typically require the measurement system to be placed at distances up to fifteen feet from the muzzle of the firearm to prevent interference from muzzle flare. The ballistics apparatus of the present invention, however, does not use optical sensors and is therefore not sensitive to muzzle flare, allowing the user to position the ballistics apparatus much closer to the muzzle of the firearm to obtain more accurate velocity measurements at the point of fire.

All examples and conditional language recited herein are intended for pedagogical purposes to aid the reader in understanding the principles of the present invention and the concepts contributed by the inventor in furthering the art. As such, they are to be construed as being without limitation to such specifically recited examples and conditions. Moreover, all statements herein reciting principles, aspects, and embodiments of the invention, as well as specific examples thereof, are intended to encompass both structural and functional equivalents thereof. Additionally, it is intended that such equivalents include both currently known equivalents as well as equivalents developed in the future, i.e., any elements developed that perform the same function, regardless of structure.

It is to be understood that the embodiments described herein are merely exemplary and that a person skilled in the art may make many variations and modifications without departing from the spirit and scope of the invention. All such variations and modifications are intended to be included within the scope of the invention.

I claim:

1. A measurement and calculation apparatus for measuring a velocity of a ballistic projectile along a predetermined trajectory, the apparatus comprising:
   a base having a front end, a rear end, and a base length extending from the front end to the rear end;
   a front gate extending from the front end of the base and a rear gate extending from the rear end of the base, each of the front and rear gates including:
   a gate stand having a left leg with a proximal end and a distal end, a right leg with a proximal end and a distal end, and a joint where the proximal ends of the left and right legs meet;
   an arm having a body that extends a distance between the distal ends of the left and right legs;
   a laser housed within the joint of the gate stand, the laser being configured to emit laser light toward the arcuate arm and between the left and right legs of the gate stand;
   at least one diffuser positioned between the laser and the arm, the at least one diffuser being configured to diffuse the laser light emitting from the laser over a diffusion angle to create a wall of light;
   a sensor array comprising a plurality of laser light sensors housed within the arm and configured to receive beams of diffused laser light emitted from the laser through the at least one diffuser, the sensor array being configured to register perturbances in the wall of light caused by a ballistic projectile;
   a chronograph processor configured to (a) receive a signal from the front gate when a perturbance in the wall of light of the front gate is registered and a signal from the rear gate when a perturbance in the wall of light of the rear gate is registered; and (b) calculate a velocity of the ballistic projectile based the signals received from the front and rear gates and the base length;
   wherein the body of the arm has an arcuate shape and includes a plurality of notification lights located along the body; and,
   wherein the notification lights include a left light located on a left portion of the arm proximate to the left leg of the gate stand, a right light located on a right portion of the arm proximate to the right leg of the gate stand, and a center light located in a center portion of the arm equidistant to the left light and the right light.

2. The measurement and calculation apparatus of claim 1, wherein both the left and right notification lights have a first vertical height from the base and the center light has a second vertical height from the base, the second height being greater than the first height.

3. A measurement and calculation apparatus for measuring a velocity of a ballistic projectile along a predetermined trajectory, the apparatus comprising:
   a base having a front end, a rear end, and a base length extending from the front end to the rear end;

a front gate extending from the front end of the base and a rear gate extending from the rear end of the base, each of the front and rear gates including:

a gate stand having a left leg with a proximal end and a distal end, a right leg with a proximal end and a distal end, and a joint where the proximal ends of the left and right legs meet;

an arm having a body that extends a distance between the distal ends of the left and right legs;

a laser housed within the joint of the gate stand, the laser being configured to emit laser light toward the arcuate arm and between the left and right legs of the gate stand;

at least one diffuser positioned between the laser and the arm, the at least one diffuser being configured to diffuse the laser light emitting from the laser over a diffusion angle to create a wall of light;

a sensor array comprising a plurality of laser light sensors housed within the arm and configured to receive beams of diffused laser light emitted from the laser through the at least one diffuser, the sensor array being configured to register perturbances in the wall of light caused by a ballistic projectile;

a chronograph processor configured to (a) receive a signal from the front gate when a perturbance in the wall of light of the front gate is registered and a signal from the rear gate when a perturbance in the wall of light of the rear gate is registered; and (b) calculate a velocity of the ballistic projectile based the signals received from the front and rear gates and the base length; and wherein the at least one diffuser includes an arcuate diffuser housed within the joint of the gate stand and a diffuser screen housed within the arm.

4. The measurement and calculation apparatus of claim 3, wherein the diffuser screen is sized and shaped to narrow portions of the laser light received from the laser into each of the plurality of laser light sensors.

5. The measurement and calculation apparatus of claim 3, wherein the diffuser screen is sized and shaped to further diffuse light received from the laser.

6. A measurement and calculation apparatus for measuring a velocity of a ballistic projectile along a predetermined trajectory, the apparatus comprising:

a base having a front end, a rear end, and a base length extending from the front end to the rear end;

a front gate extending from the front end of the base and a rear gate extending from the rear end of the base, each of the front and rear gates including:

a gate stand having a left leg with a proximal end and a distal end, a right leg with a proximal end and a distal end, and a joint where the proximal ends of the left and right legs meet;

an arm having a body that extends a distance between the distal ends of the left and right legs;

a laser housed within the joint of the gate stand, the laser being configured to emit laser light toward the arcuate arm and between the left and right legs of the gate stand;

at least one diffuser positioned between the laser and the arm, the at least one diffuser being configured to diffuse the laser light emitting from the laser over a diffusion angle to create a wall of light;

a sensor array comprising a plurality of laser light sensors housed within the arm and configured to receive beams of diffused laser light emitted from the laser through the at least one diffuser, the sensor array being configured to register perturbances in the wall of light caused by a ballistic projectile;

a chronograph processor configured to (a) receive a signal from the front gate when a perturbance in the wall of light of the front gate is registered and a signal from the rear gate when a perturbance in the wall of light of the rear gate is registered; and (b) calculate a velocity of the ballistic projectile based the signals received from the front and rear gates and the base length; and wherein the base comprises a base bar having a center hinge, a front section extending from the center hinge to the front end, and a rear section extending from the center hinge to the rear end, the center hinge being configured to orient the front section and the rear section in a collinear relationship when the apparatus is in an operating configuration and to allow one of the front section and the rear section to rotate about the center hinge when moving the apparatus from the operating configuration to a collapsed configuration.

7. The measurement and calculation apparatus of claim 1, wherein for each gate stand of the front gate and the rear gate, one of the left and right legs is rotatable about the joint and is configured to collapse against the other of the left and right legs.

8. The measurement and calculation apparatus of claim 1, further comprising a cradle sized and shaped to receive and support the base, the cradle housing the chronograph processor and being configured to allow electronic communication between the front and rear gates and the chronograph processor.

9. The measurement and calculation apparatus of claim 1, wherein the front gate includes at least one foot extension extending from the joint to the front end of the base, the at least one foot extension being hingedly connected to the front end of the base such that the front gate can be rotated about the front end of the base from a collapsed position to an operating position.

10. The measurement and calculation apparatus of claim 9, wherein the at least one foot extension is configured to enable the front gate to rotate about the front end of the base between 180 degrees and 270 degrees.

11. The measurement and calculation apparatus of claim 10, wherein the at least one foot extension includes a floor that is configured to abut the base when the front gate is in the operating position.

12. The measurement and calculation apparatus of claim 1, wherein the arm is detachable from the left leg and the right leg of the gate stand.

13. The measurement and calculation apparatus of claim 12, wherein the arm has a left end and a right end, the left end being sized and shaped to interface with the distal end of the left leg of the gate stand and the right end being sized and shaped to interface with the distal end of the right leg of the gate stand, the left and right ends of the arm including electrical contacts that enable electric communication between the sensor array in the arm and the chronograph processor.

14. The apparatus of claim 1, wherein each of the plurality of laser light sensors in each of the front gate and the rear gate is configured to transmit a signal to a controller electrically connected to each of the plurality of laser light sensors indicating a perturbance in the corresponding wall of light when an amount of light received from the wall of light drops below a predetermined threshold.

15. The apparatus of claim 14, wherein the signal comprises a voltage spike.

16. The apparatus of claim 1, wherein the at least one diffuser is configured to diffuse light emitted from the laser in an arc having an angle less than or equal to 160 degrees.

17. The apparatus of claim 1, wherein the laser is configured to emit laser light that is outside the spectrum of visible light.

18. The measurement and calculation apparatus of claim 8, wherein the cradle includes a wireless transmitter to transmit calculations from the chronograph processor to a remote device.

19. The measurement and calculation apparatus of claim 1, wherein the notification lights are arranged to change colors to indicate a break in the wall of light.

* * * * *